(12) United States Patent
Obata et al.

(10) Patent No.: US 7,084,536 B2
(45) Date of Patent: Aug. 1, 2006

(54) FLUID BEARING MOTOR, AND DISK DRIVE MOUNTED WITH SAME

(75) Inventors: Shigeo Obata, Hyogo (JP); Kaoru Matsuoka, Osaka (JP); Hideki Kuwajima, Kyoto (JP); Kenichi Miyamori, Hyogo (JP); Hiromitsu Noda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 75 days.

(21) Appl. No.: 10/799,748

(22) Filed: Mar. 15, 2004

(65) Prior Publication Data

US 2004/0189122 A1    Sep. 30, 2004

(30) Foreign Application Priority Data

Mar. 31, 2003 (JP) ............................ 2003-094954
Mar. 31, 2003 (JP) ............................ 2003-094955

(51) Int. Cl.
*H02K 5/16* (2006.01)

(52) U.S. Cl. ...................... 310/90; 310/67 R
(58) Field of Classification Search .......... 310/67 R, 310/89–90; 360/99.08, 98.07; 384/107–120
See application file for complete search history.

(56) References Cited

U.S. PATENT DOCUMENTS 6,768,236 B1 * 7/2004 Tokunaga et al. ............. 310/90
6,815,850 B1 * 11/2004 Albrecht et al. ........... 310/67 R
6,836,388 B1 * 12/2004 Nishimura et al. ....... 360/99.08

FOREIGN PATENT DOCUMENTS

| JP | 6-311695 | 11/1994 |
| JP | 8-275447 | 10/1996 |
| JP | 11-55900 | 2/1999 |
| JP | P2000-50567 A | 2/2000 |
| JP | P2002-286038 A | 10/2002 |

* cited by examiner

*Primary Examiner*—Thanh Lam
(74) *Attorney, Agent, or Firm*—McDermott Will & Emery LLP

(57) ABSTRACT

The stop ring having a surface nearly vertical to the rotational center axis, which is projected at the inner periphery of the hollow cylinder of the rotor section, and the stepped surface of the fixed shaft secured on the chassis are opposed to each other with a predetermined slight clearance provided therebetween. The clearance is filled with magnetic fluid, and further, a permanent magnet is disposed on the chassis, opposing to the other surface of the stop ring.

26 Claims, 20 Drawing Sheets

FLUID BEARING MOTOR, AND DISK DRIVE MOUNTED WITH SAME

FIELD OF THE INVENTION

The present invention relates to a fluid bearing motor used for a magnetic disk drive and an optical disk drive of a computer memory or a picture memory for recording/reproducing information at high densities, and a disk type recording/reproducing apparatus (hereinafter called disk drive) mounted with the same.

BACKGROUND OF THE INVENTION

Recently, in the field of information recording/reproducing apparatuses such as disk drive, efforts have been made to increase the capacity. For increasing the capacity, it is specially required to improve the rotational accuracy of the spindle motor for driving the disk used in the disk drive or the like. In order to meet the requirement for improving the rotational accuracy, there is an increasing trend of employing a hydrodynamic bearing in the spindle motor.

In a hydrodynamic bearing, there exists a hydrodynamic lubricant between a rotary side bearing and a fixed side bearing. The rotary side bearing and the fixed side bearing are provided with a dynamic pressure generating groove for inducing dynamic pressures to the hydrodynamic lubricant, which rotate the rotary body of the spindle motor via the hydrodynamic lubricant. That is, the spindle motor rotates in a state of being non-contact between the rotary side bearing and the fixed side bearing.

Thus, since the spindle motor rotates in a state of being non-contact, when a shock due to dropping or vibrating is applied thereto, the rotary side bearing or the rotary body moves from the fixed side bearing. In case the device is not configured so as to regulate the movement, the rotary body will slip off from the fixed side bearing. This means that the spindle motor is unable to display its function.

Accordingly, a slip-proof configuration is adopted in order to prevent the rotary body from slipping off from the fixed side bearing even when a shock due to dropping or vibrating is applied thereto.

A slip-proof configuration of a conventional fluid bearing motor will be described in the following.

As a fluid bearing motor, available are a fixed-shaft type and a rotary-shaft type.

In the fixed-shaft type, the fixed side bearing is a fixed shaft embedded in a chassis. The rotary side bearing is rotatable around the fixed shaft.

In the rotary-shaft type, the rotary side bearing is rotatably supported at the inner periphery of a cylindrical sleeve-like fixed side bearing fixed on a chassis.

First, the fixed-shaft type fluid bearing motor disclosed in Japanese Laid-open Patent H6-311695 is explained.

In this prior art example, a generally cylindrical fixed shaft is disposed upright. At the top of the fixed shaft is integrally formed an annular thrust plate projecting axially outwardly. On the other hand, the sleeve member which is a part of the rotary body is generally cylindrical which is increased in outer diameter at the top end. The inner periphery of the sleeve member includes a radial slide portion being generally cylindrical with a small diameter, a medium bore portion increased in diameter there above, and a large bore portion further increased in diameter above the medium bore portion.

The sleeve member is externally fitted on a fixed shaft from thereunder before the fixed shaft is securely set into a through-hole. An annular thrust holding plate is internally secured in a state such that the inner periphery is diametrically spaced apart against the fixed shaft in the large bore portion of the sleeve member. And, by the thrust holding plate and the sleeve member, a thrust plate is fitted in the annular recess of an opening diametrically outwardly formed at the inner side of the medium bore portion.

There is provided a herringbone groove at the annular portion of nearly the upper half of the radial slide portion of the sleeve member. A radial dynamic bearing is configured in that radial load pressures are generated by a liquid lubricant filled in the gap between the herringbone groove and the fixed shaft portion (radial receiver) opposing to the radial slide portion of the sleeve member.

Also, the upper and lower annular surfaces (axial receiver) of the thrust plate and the upper and lower annular surfaces (axial slide) of the annular recess respectively configure axial dynamic bearing portions. Herringbone grooves are formed along the entire peripheries of the upper and lower annular surfaces of the thrust plate, and high pressures are generated by the lubricant filled between the upper and lower annular surfaces of the annular groove, thereby forming an axial dynamic bearing portion.

In this way, it is configured in that the sleeve member or the like is able to freely rotate about the fixed shaft or the like via a lubricant. And, the displacement in a direction axial to the fixed shaft during rotation of the sleeve member can be sufficiently lessened by the axial dynamic bearing portions. Accordingly, even in case a shock is applied thereto, the sleeve member being a part of the rotary body will not slip off from the fixed shaft being a fixed side bearing.

Next, the shaft-fixed type fluid bearing motor disclosed in Japanese Laid-open Paten 2002-286038 is explained in the following.

In this prior art example, a shaft is externally fixed in a bracket. And, there are provided a disk-like upper thrust plate and lower thrust plate projected radially outwardly at the upper end and lower end of the shaft. There is a rotor which is provided with a sleeve supported by a shaft at the inner side thereof via a fine clearance for holding the lubricant. The sleeve is provided with an upper counter plate and lower counter plate in such manner as to cover the outsides of the upper thrust plate and the lower thrust plate. The upper and lower portions at the inner periphery of the through-hole of the sleeve are respectively formed with herringbone dynamic grooves by means of electrochemical machining. The underside of the upper thrust plate and the top of the lower thrust plate are respectively formed with spiral dynamic grooves by means of electrochemical machining. The portion ranging from the outer periphery of the shaft adjacent to the top of a gas-intervening portion disposed in the middle of the shaft to the underside of the upper thrust plate, the outer periphery thereof, and the outer periphery of the top surface thereof is formed with fine clearances against the portion ranging from the top of the through-hole at the inner periphery of the opposing sleeve to the underside of the upper counter plate, where the lubricant is retained.

In such a configuration, the radial dynamic bearing portion is configured with the upper and lower portions formed with the herringbone dynamic grooves at the inner periphery of the through-hole of the sleeve, the shaft opposing thereto, and the lubricant retained in the fine clearances. Also, the axial dynamic bearing is configured with (i) the underside of the upper thrust plate and the top of the lower thrust plate respectively formed with spiral dynamic grooves, (ii) the underside of the upper counter plate and the top of the lower counter plate respectively opposing thereto, and (iii) the lubricant retained in the fine clearances. The upper thrust plate and the lower thrust plate are held by the respective surfaces of the stepped portions of the sleeve respectively opposing to the underside of the upper thrust plate and the top of the lower thrust plate, and the underside of the upper counter plate and the top of the lower counter plate disposed in such manner as to cover the outsides of the upper and lower thrust plates.

In such a configuration, the displacement in a direction axial to the shaft during rotation of the sleeve can be lessened enough. Accordingly, even in case a shock is applied thereto, the sleeve being a part of the rotary body will not slip off from the shaft being the fixed side bearing.

Next, the rotary-type fluid bearing motor disclosed in Japanese Laid-open Patent H8-275447 is explained in the following.

In this prior art example, at the inner periphery of the cylindrical portion of a housing is disposed a sleeve having a projection at the outer periphery of the top end thereof. A motor rotates about a shaft fastened to the center of a rotor hub with a stopper fixed thereon. A thrust plate is caulked and secured to the bottom end of the sleeve fixed on the inner periphery of the housing, in which lubricating oil is filled as a fluid material. The thrust plate is formed with dynamic bearing grooves which are spiral grooves. The shaft is supported so as to be rotatable in a thrust direction due to dynamic pressure generated at the thrust plate and the shaft end as it rotates. Simultaneously, the shaft is supported so as to be rotatable in a radial direction as well due to dynamic pressure generated in the lubricating oil in a state of being non-contact with the sleeve.

When the rotor hub moves in a thrust direction, the stopper fixed on the rotor hub abuts the projection disposed at the sleeve. That is, it is configured in that the rotor hub will not slip off therefrom.

The motor assembling procedure is such that (i) a stator assembly with a coil-wound stator core fixed in a housing, (ii) a sleeve bearing assembly with a thrust plate fixed on a sleeve, and (iii) a rotor assembly with a shaft fixed on a rotor hub with a magnet are respectively manufactured. Subsequently, lubricating oil is filled into the sleeve of the sleeve bearing assembly, and the shaft of the rotor assembly is inserted to make a motor sub-assembly. In the condition of the motor sub-assembly, the stopper is secured to the rotor hub. Then, the stopper is in a state of being able to engage the projection disposed at the outer periphery of the top end of the sleeve from thereunder. After that, the sleeve is inserted into the cylindrical portion of the housing of the stator assembly, thereby completing the assembling procedure.

Next, the rotary-shaft type fluid bearing motor disclosed in Japanese Laid-open Patent H11-55900 is explained in the following.

In this prior art example, a hub fixed by a method of press-fitting to a rotary shaft or the like is provided with a stop member made from a magnetic material. Further, an attracting magnet is fixed to the stop member, which is opposed to a core of a coil assembly.

The bearing provided with a herringbone groove is a hydrodynamic bearing which supports the rotary shaft so as to be rotatable in a radial direction, and a thrust plate supports the rotary shaft in an axial direction.

In this configuration, even when a shock or vibration is applied to the motor, the rotary body is prevented from floating due to the attractive force generated between the attracting magnet and the coil assembly. On the other hand, even in case of excessive shocks, the rotary body is prevented from slipping off because it comes in slide contact with the bearing when moving in a thrust direction.

Next, the rotary-shaft type fluid bearing motor disclosed in Japanese Laid-open Patent 2000-50567 is explained in the following.

In this prior art example, a rotor hub is provided with a stop plate for preventing the rotor hub from slipping off. Also, a shaft is secured at the center of the rotor hub, and a drive magnet is secured at the outer periphery, thereby configuring a rotor section.

The shaft is rotatably inserted into the inner bore of a sleeve having first and second cylindrical portions provided with herringbone grooves at the inner periphery thereof. And, a lubricating fluid is filled in the clearance between the shaft and the sleeve, thereby configuring a radial hydrodynamic bearing. Also, one end of the shaft is spherically shaped, and a pivot bearing is formed by the spherical shape and a thrust plate. And, a lubricating fluid is filled in the pivot bearing clearance, thereby configuring a thrust pivot bearing.

The method of assembling in the prior art example is explained in the following. The thrust plate is caulked and fixed to the sleeve to make a bearing assembly. Subsequently, a specified amount of lubricating oil is applied to the inner periphery of the sleeve of the bearing assembly, and then, the shaft of a hub assembly having a rotor hub with a magnetized drive magnet bonded is inserted therein. A stop plate is fixed to the hub, and the stop plate prevents the bearing assembly from slipping off. A predetermined amount of adhesive is applied to the inner periphery of the internal cylindrical portion of a stator assembly, followed by inserting a sleeve with a rotor hub built in. The stator assembly is such that a coil assembly with a coil wound on a stator core is secured by adhesive in a housing.

In this prior art example, the stop plate is caulked and fixed to the rotor hub. A flange is formed at the end of the sleeve. Due to this configuration, when the rotor hub moves in a thrust direction, the flange stops the stop plate, thereby preventing the rotor hub from slipping off.

In the configuration of the above conventional fluid bearing motor, the fluid bearing motor must be assembled according to the procedure as follows: (i) hydrodynamic lubricant is applied to the fixed side bearing, (ii) the rotary body is inserted into the fixed side bearing to be assembled, (iii) a member having a stopping function is fixed to the rotary body, (iv) the rotary body is assembled in such manner as not to slip off from the fixed side bearing, and (v) after that, the fixed side bearing is secured onto a substrate (or bracket, base member, housing) by press-fitting, bonding or other method.

In case the fluid bearing motor is assembled by such procedure, (i) with hydrodynamic lubricant (or lubricating agent, lubricating oil, lubricating fluid) filled in the assembly of the fixed side bearing and the rotary body, a member having a stopping function is fitted to the rotary body, and the fixed side bearing is secured on a substrate. That is, the assembling procedure includes complicated steps requiring careful handling.

Also, the fixed side bearing and rotary body assembly filled with hydrodynamic lubricant is to be frequently handled during the assembling work. Accordingly, it may give rise to leaking or running of the hydrodynamic lubricant filled. And, it is difficult to retain the specified amount of hydrodynamic lubricant. Further, the fixed side bearing may abut or come into contact with the portion opposed to the fixed side bearing of the rotary body. In that case, there may arise scratches or slight bruises on any one of the fixed side bearing and the portion opposed to the fixed side bearing of the rotary body. As a result, it gives trouble in the finished product after completion of the assembly.

Also, in the conventional shaft-fixed fluid bearing motor, there may arise a problem of leaking or running of the hydrodynamic lubricant during the assembling work or due to excessive shocks or other causes. Consequently, in case the hydrodynamic lubricant sticks to the top surface of the thrust holding plate (or upper counter plate, lower counter plate, cover plate), the hydrodynamic lubricant sticks to the surface of the disk attached to the outer periphery of the rotary body due to the centrifugal force caused by rotation, and it may give damage to the recording medium formed on the surface of the disk.

Further, in the above reference for a rotary-shaft type fluid bearing motor, nothing is mentioned about a cover of a fluid bearing motor or disk drive. For the reduction in thickness of a disk drive, a cover is generally disposed close to a rotary body. In this case, there arises a problem such that when the cover is strained due to an external force applied thereto, it comes in slide contact with the rotary body of the fluid bearing motor located near there, resulting in rotational variation of the fluid bearing motor.

SUMMARY OF THE INVENTION

The present invention is intended to solve the above problems.

The fluid bearing motor of the present invention comprises:
a fixed bearing member;
a rotary bearing member;
a hydrodynamic lubricant filled between the fixed bearing member and the rotary bearing member;
a rotor section having a hollow cylinder in the middle thereof, a flange formed at one end of the hollow cylinder, and a rotary magnet disposed on the flange;
a fixed shaft with one end fixed on a chassis, which passes through the hollow cylinder; and
a stator provided with a coil which generates a rotational force in cooperation with the rotary magnet,
wherein the fixed bearing member is disposed on the chassis,
the fixed bearing member and the rotary bearing member configure a bearing which rotatably supports the rotor section,
the bearing is arranged at a position apart from the fixed shaft,
the fixed shaft includes a small diameter portion and a large diameter portion,
the hollow cylinder is formed with a projection at a part of its inner periphery, and
the projection is arranged such that it is positioned within the diameter of the large diameter portion of the fixed shaft and outside the small diameter portion.

Also, the fluid bearing motor of the present invention, having another configuration, comprises:
a fixed bearing member;
a rotary bearing member;
a hydrodynamic lubricant filled between the fixed bearing member and the rotary bearing member;
a rotor section having a hollow cylinder in the middle thereof, a flange formed at one end of the hollow cylinder, and a rotary magnet disposed at the flange;
a fixed shaft with one end fixed on a chassis, which passes through the hollow cylinder; and
a stator provided with a coil which generates a rotational force in cooperation with the rotary magnet,
wherein the fixed bearing member is disposed on the chassis,
the fixed bearing member and the rotary bearing member configure a bearing which rotatably supports the rotor section,
the bearing is arranged at a position apart from the fixed shaft,
the fixed bearing member comprises a first inner periphery and a second inner periphery,
the first inner periphery is smaller in diameter than the second inner periphery,
the hollow cylinder is formed with a projection at a part of its outer periphery, and
the projection is arranged in such manner that it is positioned within the diameter of the second inner periphery of the fixed bearing member and outside the first inner periphery.

The disk drive of the present invention comprises:
a fluid bearing motor described above or a fluid bearing motor having another configuration described above;
at least one disk with recording medium formed on the surface thereof, which is placed on the top of a flange;
a cover which abuts one end of a fixed shaft;
at least one signal conversion element for recording/reproducing signals in the recording medium formed on the disk, and
at least one oscillating means for positioning the signal conversion element to a specified track position.

DESCRIPTION OF THE PREFERRED EMBODIMENT

The preferred embodiments of the present invention will be described in the following with reference to the drawings.

(Preferred Embodiment 1)

Figure 1:
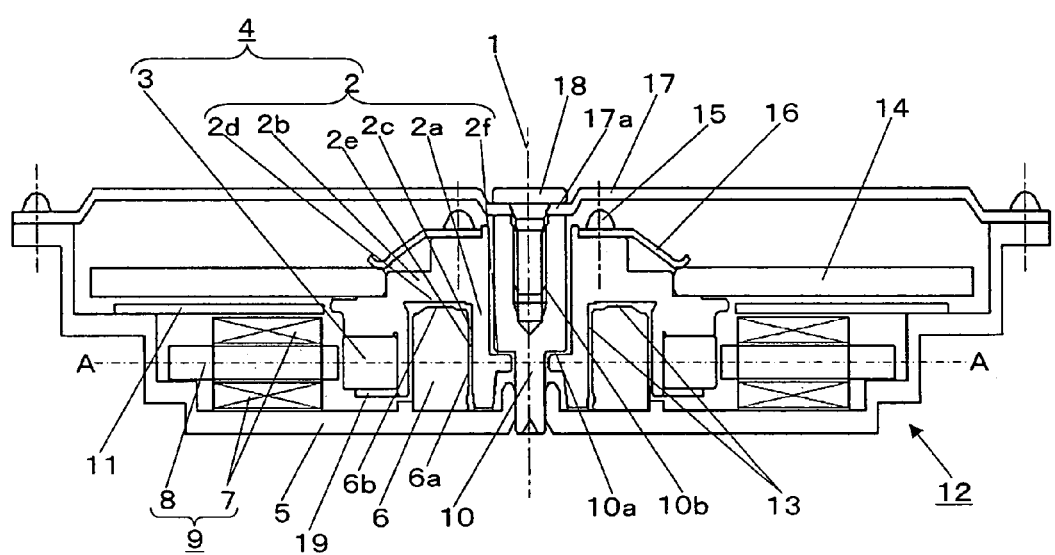
FIG. 1 is a side sectional view showing the configuration of the main section of a fluid bearing motor of a disk drive in the preferred embodiment 1 of the present invention.
Figure 2:
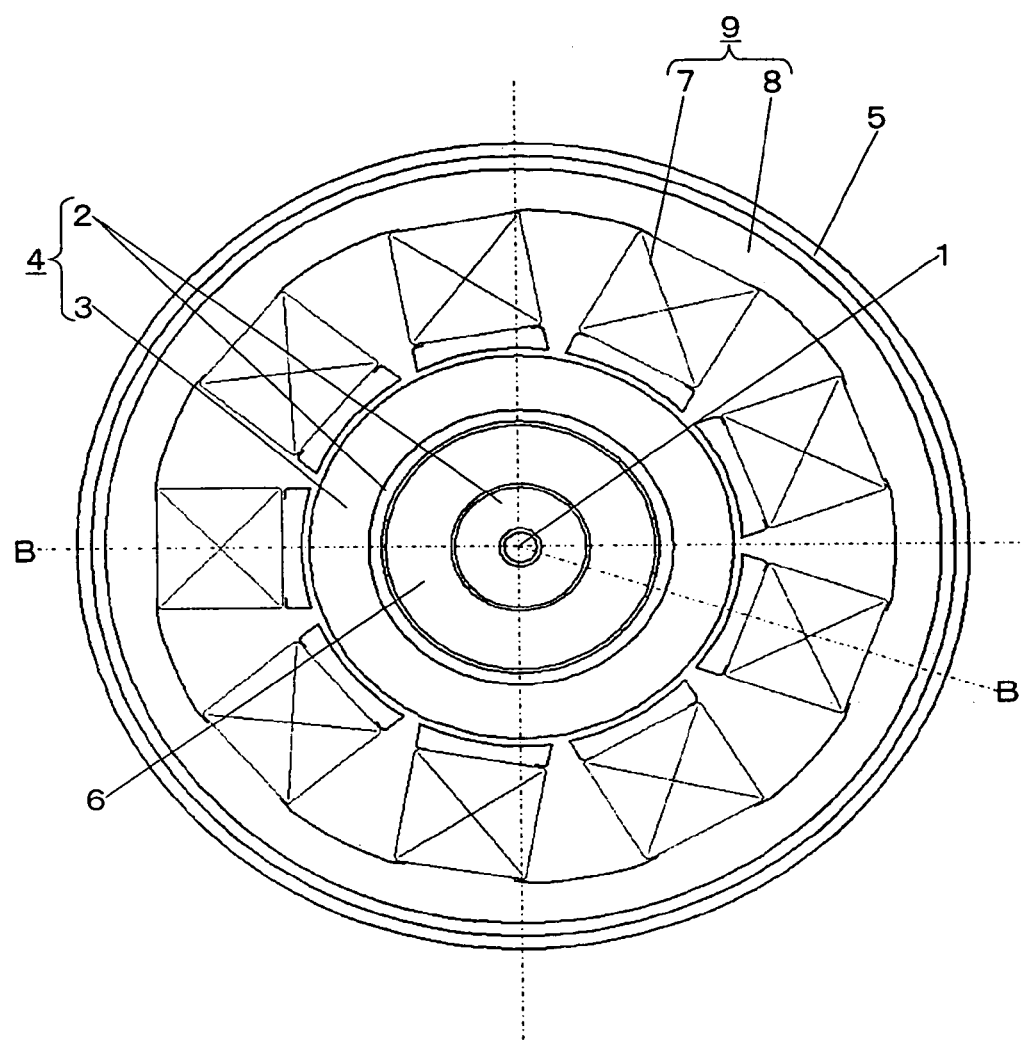
FIG. 2 is a plane sectional view showing the configuration of main section of a fluid bearing motor of a disk drive in the preferred embodiment 1 of the present invention.

FIG. 1 and FIG. 2 describe a fluid bearing motor and a disk drive in the preferred embodiment 1 of the present invention.

FIG. 1 is a side sectional view showing the configuration of main section of a fluid bearing motor of a disk drive in the preferred embodiment 1 of the present invention. FIG. 2 is a plane sectional view showing the configuration of main section of a fluid bearing motor of a disk drive in the preferred embodiment 1 of the present invention. FIG. 1 corresponds to the cross-section of the fluid bearing motor in the preferred embodiment 1 of the present invention when it is cut at the plane including the rotational center axis along the B—B line of FIG. 2. FIG. 2 corresponds to the cross-section of the fluid bearing motor in the preferred embodiment 1 of the present invention when it is cut along the A—A line of the FIG. 1.

In FIG. 1 and FIG. 2, rotor section 2 rotating around rotational center 1 includes hollow cylinder 2a and flange 2b in the vicinity of the rotational center 1. Also, at bottom end 2d of outer periphery 2c and flange 2b of the hollow cylinder 2a is formed a dynamic pressure generating groove where rotary side bearing 2e configuring a fluid bearing is disposed. Also, on the underside of the outer periphery of the flange 2b of the rotor section 2 is fixed rotary magnet 3 magnetized by a plurality of magnetic poles by means of press-fitting, bonding or other method. The rotor section 2 and the rotary magnet 3 comprises rotary body 4.

The bore diameter at the inner periphery of the hollow cylinder 2a is larger at the flange 2b (large bore portion) and smaller at a part (small bore portion) of chassis 5 at least. That is, the inner periphery of the hollow cylinder 2a is formed with a first stepped surface 2f at the boundary between the large bore portion and the small bore portion. The first stepped surface 2f is generally vertical to the axial direction of the rotational center 1.

Corresponding to rotary side bearing 2e, fixed side bearing 6 is fixed on the chassis 5 by means of press-fitting, bonding, welding or other well-known method. Stator 9 includes coil 7 and stator core 8 and is fixed on chassis 5. Coil 7 is wound around each of the plurality of magnetic pole-tips of the stator 9. The inner periphery at the end of the plurality of magnetic pole-tips of the stator 9 is opposed to the outer periphery of the rotary magnet 3 fixed on the rotor section 2.

Fixed shaft 10 with its axis nearly aligned to the rotational center 1 is spaced apart from the inner periphery of the hollow cylinder 2a of the rotor section 2, and is secured on the chassis 5 by means of press-fitting, bonding or similar method. Shield plate 11 for magnetically shielding magnetic flux leaking from the stator 9 is fixed on the chassis 5. Fluid bearing motor 12 is configured in this way.

The fixed shaft 10 has a stepped-shaft shape such that its outer diameter is smaller at the chassis 5 (small diameter portion) and the diameter at its outer periphery is larger at the opposite side (large diameter portion) of the chassis 5. At the chassis 5, the outer diameter of the fixed shaft 10 is smaller than the bore diameter of the hollow cylinder 2a, and at the opposite side of the chassis 5, the outer diameter of the fixed shaft 10 is smaller than the bore diameter at the flange 2b of the hollow cylinder 2a. The second stepped surface 10a of the fixed shaft 10 which is formed at the boundary between the large diameter portion and the small diameter portion is nearly vertical to the axial direction of the rotational center 1. The first stepped surface 2f and the second stepped surface 10a is very slightly spaced apart from each other, opposing to each other.

Female thread 10b is formed at the center of the end portion of the fixed shaft 10 at the opposite side of the chassis 5.

Between the rotary side bearing 2e and the fixed side bearing 6 opposing to each other is filled hydrodynamic lubricant 13 such as ester type synthetic oil. And, a radial fluid bearing is configured by the outer periphery 2c of the hollow cylinder 2a, the inner periphery 6a of the fixed side bearing 6 opposing thereto, and the hydrodynamic lubricant 13. Also, a thrust fluid bearing is configured by the lower end 2d of the flange 2b, the upper end 6b of the fixed side bearing 6 opposing thereto, and the hydrodynamic lubricant 13. The dynamic pressure generating groove of the radial fluid bearing is a herringbone groove configured by well-known technology. The dynamic pressure generating groove of the thrust fluid bearing is, for example, spirally shaped such that the hydrodynamic lubricant 13 is pumped up in the direction toward the rotational center 1. In use of such shape, the hydrodynamic lubricant 13 will not run outside.

In the above description, the dynamic pressure generating groove is formed at the rotary side bearing 2e of the rotor section 2, but the present invention is not limited to this configuration. It is preferable for the radial fluid bearing to form the dynamic pressure generating groove at either one of the rotary side bearing 2e and the fixed side bearing 6, that is, at either one of the outer periphery 2c of the hollow cylinder 2a and the inner periphery 6a of the fixed side bearing 6 opposing thereto. It is preferable for the thrust fluid bearing to form the dynamic pressure generating groove at either one of the lower end 2d of the flange 2b and the upper end 6b of the fixed side bearing 6 opposing thereto.

Figure 3:
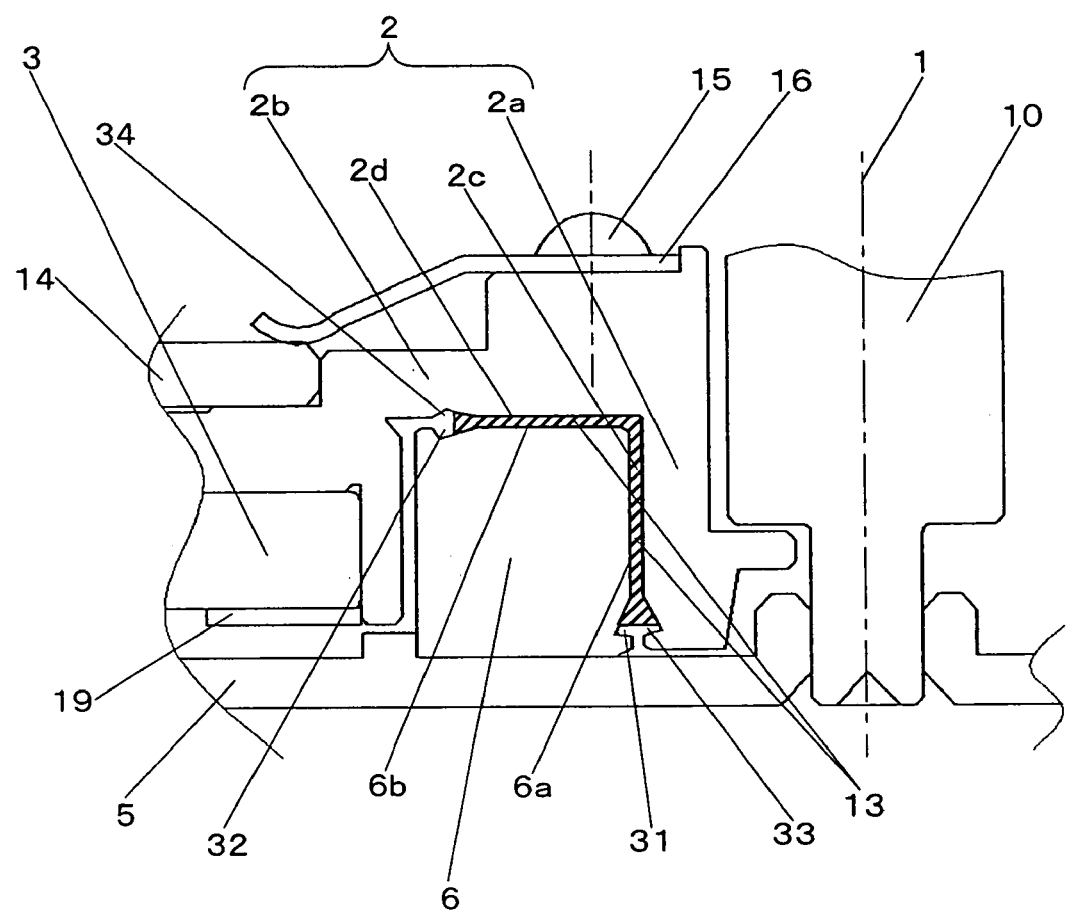
FIG. 3 is a partly sectional view showing the configuration of the hydrodynamic lubricant reservoir of a fluid bearing motor of a disk drive in the preferred embodiment 1 of the present invention.

FIG. 3 shows the configuration of the hydrodynamic lubricant reservoir of a fluid bearing motor of a disk drive in the preferred embodiment 1 of the present invention. Hydrodynamic lubricant reservoir 31 is formed in the vicinity of the lower side (chassis side) in the axial direction of the radial fluid bearing, and hydrodynamic lubricant reservoir 32 is formed at the outer diameter side in the radial direction of the thrust fluid bearing. Further, hydrodynamic lubricant reservoir 33 is formed in a position nearly opposed to the dynamic lubricant reservoir 31 in the vicinity of the lower side (chassis side) in the axial direction of the radial fluid bearing, and hydrodynamic lubricant reservoir 34 is formed in a position nearly opposed to the hydrodynamic lubricant reservoir 32 at the outer diameter in the radial direction of the thrust fluid bearing. In this configuration, the hydrodynamic lubricant 13 will not run outside due to the action of surface tension or the like of the hydrodynamic lubricant 13 intervening in the range from the hydrodynamic lubricant reservoir 31 to the hydrodynamic lubricant reservoir 34.

The shape of the cross-section ranging from the hydrodynamic lubricant reservoir 31 to the hydrodynamic lubricant reservoir 34 is nearly triangular in the figure, but the configuration is not limited to this shape. Also, it is possible to omit the hydrodynamic lubricant reservoir 33 and the hydrodynamic lubricant reservoir 34.

Next, the assembling procedure of the fluid bearing motor 12 in the present embodiment will be briefly described in the following.

The rotary magnet 3 is fixed on the rotor section 2 to make the rotary body 4. The fixed side bearing 6, the stator 9 with coil 7 wound on stator core 8 and the shield plate 11 are respectively fixed in the predetermined positions of the chassis 5 to make a chassis unit. After the hydrodynamic lubricant 13 is applied (filled) in each dynamic pressure generating groove of the radial fluid bearing and the thrust fluid bearing, the rotary side bearing 2e of the rotary body 4 is inserted into the fixed side bearing 6 of the chassis unit. After that, the clearance between the second stepped surface 10a and the first stepped surface 2f is managed so as to become a predetermined size, and then the fixed shaft 10 is inserted into the hollow of the cylinder 2a and is secured on the chassis 5 by means of press-fitting, bonding or well-known method.

After assembling the motor 12, disk 14 with recording medium (not shown) formed thereon is placed on the top surface of the flange 2b of the rotor section 2. Disk holding member 16 having elasticity is secured on the rotor section by means of screw 15, and thereby, the disk 14 is secured on the top surface of the flange 2b.

Although it is not shown, a signal conversion element (such as a magnetic head and optical head) for recording/reproducing signals on the recording medium of the disk 14 is disposed opposite to the disk 14 via an oscillating means (such as a suspension or optical pickup carrier) for positioning the element to a predetermined track position.

Also, the recording medium to be formed on the disk 14 is preferable to be formed on both upper and lower sides of the disk 14. In this case, the signal conversion element and the oscillating means are configured so as to correspond to the respective recording mediums formed on the upper and lower sides of the disk 14.

Next, the lower end of abutment 17a of cover 17 is abutted on the upper end of the fixed shaft 10. And, the cover 17 is screwed to the female thread 10b of the fixed shaft 10 by means of set-screw 18 via the through-hole formed in the abutment. Further, the peripheral edge of cover 17 is screwed to the chassis 5 or a casing (not shown). The disk drive is configured by disk 14, the signal conversion element, the oscillating means, fluid bearing motor 12, and cover 17. Incidentally, the cover 17 and the fixed shaft 10 are not always necessary to be screwed.

Even in case the cover 17 is pressed by some external force, since the tip end of the fixed shaft 10 is positioned higher than the end (the end of a portion nearest to the abutment 17a of cover 17) of the uppermost end of the rotary portion of the rotor section 2 or rotary body 4, and also the abutment 17a of cover 17 is in contact with the tip end of the fixed shaft 10, the cover 17 will not come in slide contact with the rotary portion of the fluid bearing motor 12. That is, it will not result in rotational variation of the fluid bearing motor 12.

The clearance between the upper most end of the rotary body 4 and the abutment 17a of cover 17 is greater than the clearance between the first stepped surface 2f and the second stepped surface 10a.

Also, the cover 17 is fastened to the fixed shaft 10 at the top center of the fluid bearing motor 12, and thereby, the whole casing including the chassis 5 is improved in rigidity, making it possible to make the resonance point higher. As a result, the level of vibration generated due to the rotation of the fluid bearing motor 12 or the like can be effectively suppressed. Also, as the whole casing is improved in rigidity, even when excessive load such as dropping impact is applied to the casing, it is possible to prevent the occurrence of permanent deformation.

Also, since a magnetic material is used for the chassis 5, magnetic attraction is generated between the rotary magnet 3 and the chassis 5 opposed to the lower end thereof and between the stator 9 and the rotary magnet 3.respectively. Thus, the rotor section 2 can be prevented from floating against normal vibration or shocks. When the magnetic attraction between the rotary magnet 3 and the chassis 5 is excessive, the amount of floating is reduced by the thrust fluid bearing or it may fail to float. However, the amount of floating of the rotor section 2 due to rotation of the rotor section 2 can be maintained by providing shield plate 19 for adjusting the attraction on a surface opposing to the chassis of rotary magnet 3.

Also, even in case of excessive vibration, dropping or other shocks, the first stepped surface 2f comes in slide contact with the second stepped surface 10a, and then, the rotary side bearing 2e or the rotor section 2 will no slip off from the fixed side bearing 6.

Further, since the clearance between the first stepped surface 2f of the hollow cylinder 2a and the second stepped surface 10a of the fixed shaft 10 is very slight, even when the first stepped surface 2f comes in slide contact with the second stepped surface 10a, the amount of floating (movement) of the rotor section 2 can be greatly reduced. That is, there arises no problem such that the disk 14 bumps excessively against the signal conversion element for recording/reproducing signals on the recording medium, causing the surface of disk 14 or the signal conversion element to be seriously damaged. Also, the oscillating means will not be seriously damaged.

Also, setting the fixed shaft 10 through the hollow of the hollow cylinder 2a of the rotor section 2, the opposing portions of the lower end 2d of flange 2b and the upper end 6b of fixed side bearing 6 becomes remote from the rotational center 1. As a result, it increases in bearing rigidity as a thrust fluid bearing. Accordingly, the axial length of the radial fluid bearing can be lessened, and the fluid bearing motor 12 and the disk drive can be reduced in thickness.

Figure 4:
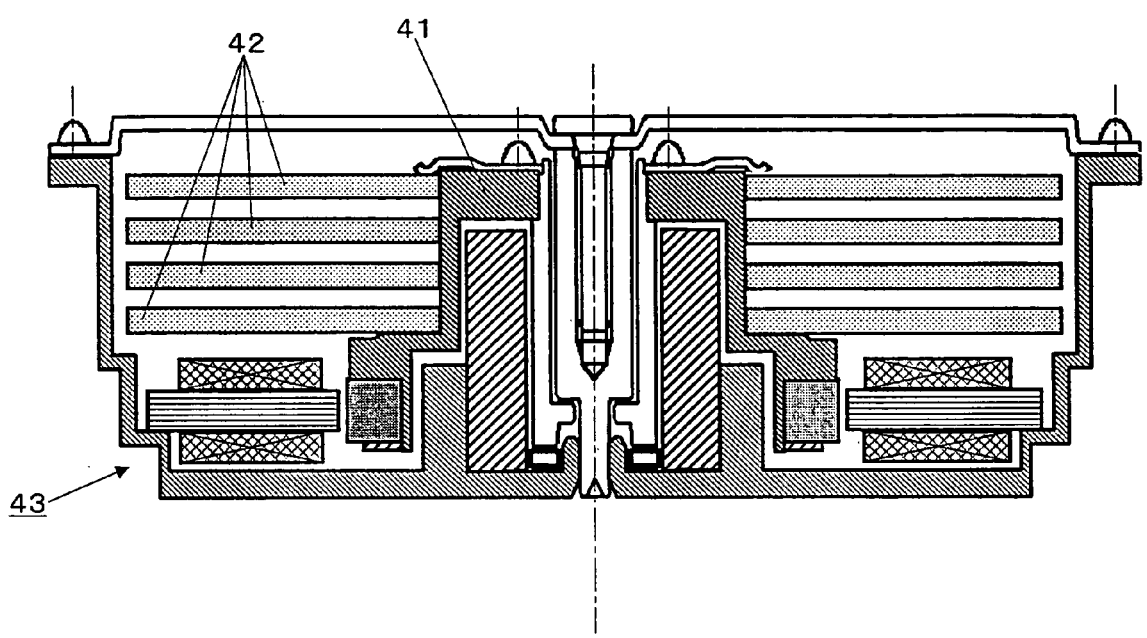
FIG. 4 is a side sectional view showing the configuration of main section of another fluid bearing motor of a disk drive in the preferred embodiment 1 of the present invention.

Also, in the preferred embodiment 1 described above, the fluid bearing motor and the disk drive are loaded with one disk, but as shown in FIG. 4, it is also possible to configure the fluid bearing motor 43 by a well-known method so that the rotor section 41 can be loaded with a plurality of disks 42.

In the preferred embodiment 1, a so-called radial gap inner rotor motor is described, but the present invention is not limited to this configuration. It can be applied to the configuration of a so-called radial gap outer rotor motor as well.

Figure 5:
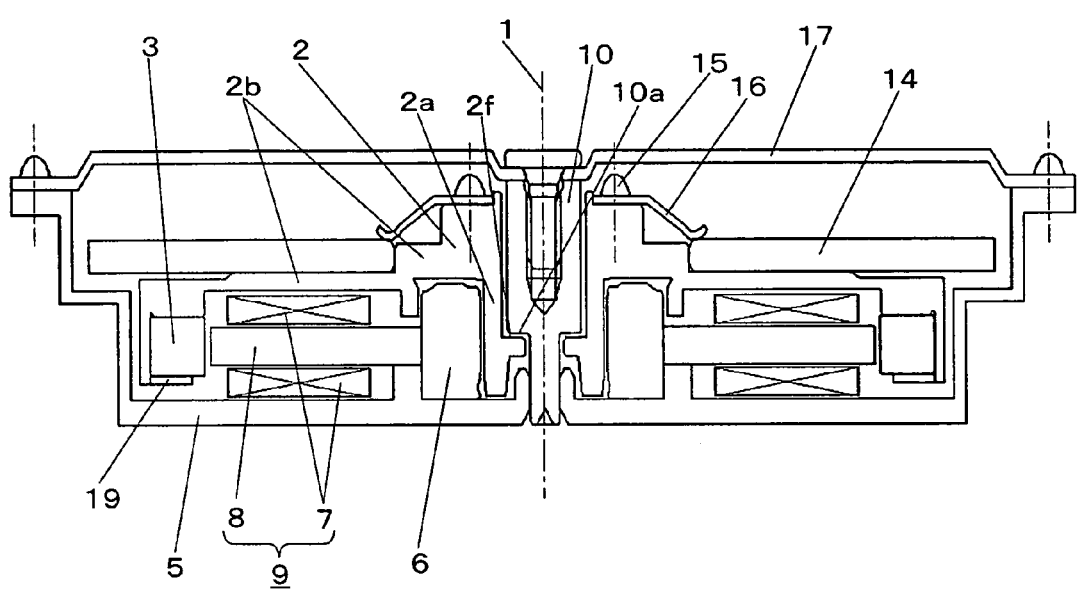
FIG. 5 is a side sectional view showing the configuration of main section of a fluid bearing motor of an outer rotor motor type of a disk drive in the preferred embodiment 1 of the present invention.

FIG. 5 is an example of radial gap outer rotor motor. In FIG. 5, same elements and names as in FIG. 1 are given same reference numerals. The stator 9 is fixed on the chassis 5 or on the chassis 5 via the fixed side bearing 6 in such manner that the outer periphery of stator 9 with coil 7 wound on stator core 8 is opposed to the inner periphery of the rotary magnet 3 fastened to the rotor section 2. The fixed shaft 10 is inserted into the hollow of the hollow cylinder 2a of the rotor section 2 with a clearance provided therebetween. The configuration in which a predetermined slight clearance is provided between the second stepped surface 10a of the fixed shaft 10 and the first stepped surface 2f of the hollow cylinder 2a of the rotor section 2 is identical with that of the preferred embodiment described above. The other configurations are same as those of the above preferred embodiment, and the detailed description is omitted.

In the present preferred embodiment, as for the predetermined size of clearance between the first stepped surface of the inner periphery of the hollow cylinder of the rotor section and the second stepped surface of the fixed shaft, it is necessary to make the clearance greater than the surface roughness based on the machining accuracy of the first and second stepped surfaces, and also, it is limited depending upon the property of the fluid filled therein. At the bearing of the fluid bearing motor in the present invention, it is desirable to set the clearance between the first and second stepped surfaces to a range from 5 µm to 100 µm.

(Preferred Embodiment 2)

Figure 6:
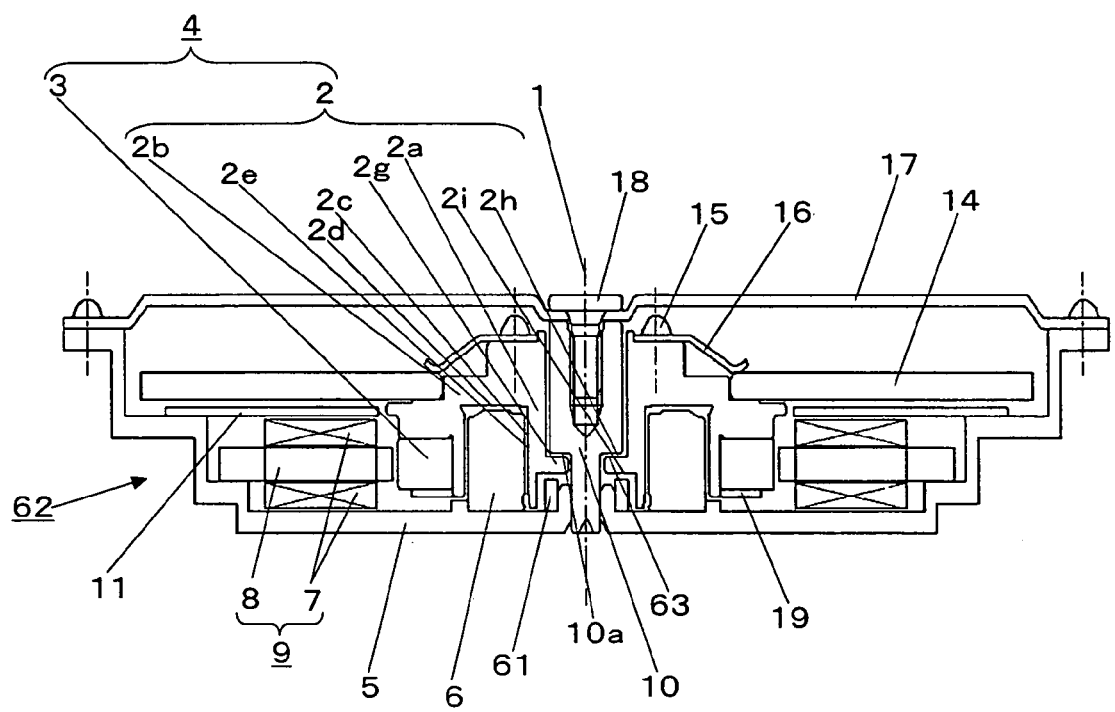
FIG. 6 is a side sectional view showing the configuration of the main section of a fluid bearing motor of a disk drive in the preferred embodiment 2 of the present invention.

FIG. 6 is a side sectional view showing the configuration of main section of a fluid bearing motor of a disk drive in the preferred embodiment 2 of the present invention. It shows the cross-section of the fluid bearing motor cut at a plane including the rotational center axis. In FIG. 6, same elements and names as in FIG. 1 are given same reference numerals.

In FIG. 6, the rotor section 2 rotating around the rotational center 1 includes the hollow cylinder 2a and flange 2b in the vicinity of rotational center 1. The outer periphery 2c of hollow cylinder 2a and the lower end 2d of flange 2b are formed with dynamic pressure generating grooves, and with rotary side bearing 2e that is a fluid bearing. The rotary magnet 3 magnetized by a plurality of magnetic poles is fixed on the underside of the outer periphery of flange 2b by means of press-fitting, bonding or other method. The rotary body 4 comprises the rotor section 2 and the rotary magnet 3.

In the present preferred embodiment, the shape of the inner periphery of the hollow cylinder 2a is different from that in the preferred embodiment 1. As shown in the figure, projection 2g is formed corresponding to the small bore portion in the preferred embodiment 1. The projection 2g is formed between the chassis 5 at the inner periphery thereof and the flange 2b. The bore diameter at flange 2b of the hollow cylinder 2a is larger than the bore diameter of projection 2g. Also, the bore diameter at chassis 5 of the hollow cylinder 2a is larger than the bore diameter of projection 2g and at least larger than the bore diameter at the flange 2b. In this case, the surface at flange 2b of the flange side projection 2g is the first stepped surface 2h. Also, the lower stepped surface 2i that is the surface at chassis 5 of the projection 2g and the first stepped surface 2h are nearly vertical to the axial direction of the rotational center 1.

Also, the same as in the preferred embodiment 1, (i) fixed side bearing 6 corresponding to rotary side bearing 2e of rotor section 2, (ii) stator 9 with coil 7 wound on stator core 8, opposing to the outer periphery of rotary magnet 3, (iii) fixed shaft 10 having a stepped shaft shape, and (iv) shield plate 11 are fixed on chassis 5. On the other hand, permanent magnet 61 is fixed to the chassis 5 by means of bonding or other method so as to be opposed to the lower stepped surface 2i of projection 2g with a slight clearance provided therebetween. The permanent magnet 61 is disposed without coming in contact with the inner periphery of the hollow cylinder 2a. The fluid bearing motor 62 is configured as described above.

Figure 7:
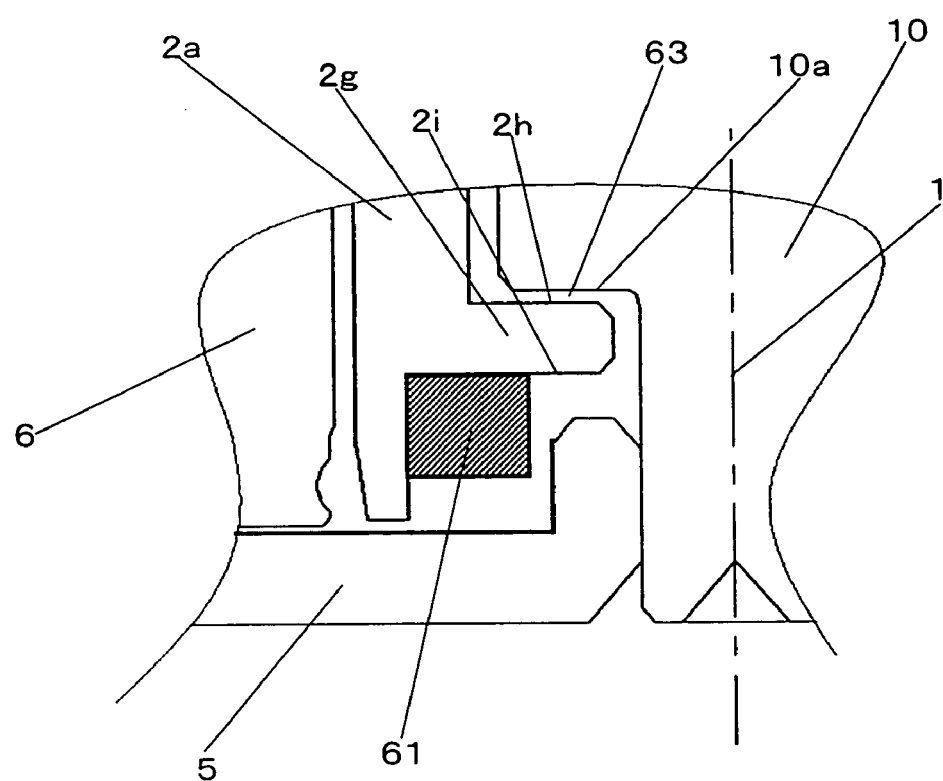
FIG. 7 is a partly enlarged sectional view showing the configuration of another fluid bearing motor of a disk drive in the preferred embodiment 2 of the present invention.

Instead of fixing the permanent magnet 61 to the chassis 5, as shown in the partly enlarged sectional view of FIG. 7, it is also preferable to be fixed on the lower stepped surface 2i of projection 2g.

The fixed shaft 10 is secured on the chassis 5 in such manner that the second stepped surface 0a is opposed to the first stepped surface 2h of projection 2g with a very small predetermined clearance 63 provided therebetween. The predetermined clearance 63 is filled (supplied) with magnetic fluid containing, for example, synthetic oil of hydrocarbon or ester type.

By using magnetic material as the rotor section 2 and fixed shaft 10, a closed magnetic circuit is formed where the magnetic flux flows in the order of (a) permanent magnet 61, (b) clearance between permanent magnet 61 and lower stepped surface 2i of projection 2g, (c) projection 2g, (d) clearance 63, (e) fixed shaft 10, (a) permanent magnet 61. Since a closed magnetic circuit is formed in this way, the magnetic fluid filled in the clearance 63 is attracted. That is, the magnetic fluid is free from leaking, scattering, or running outside. Thus, it is preferable to use a magnetic material for the chassis 5 in order to form a closed magnetic circuit.

Moreover, for example, the configuration of the fluid bearing and hydrodynamic lubricant reservoir and the assembling procedure are identical with those in the preferred embodiment 1, and the description is omitted here.

Figure 8:
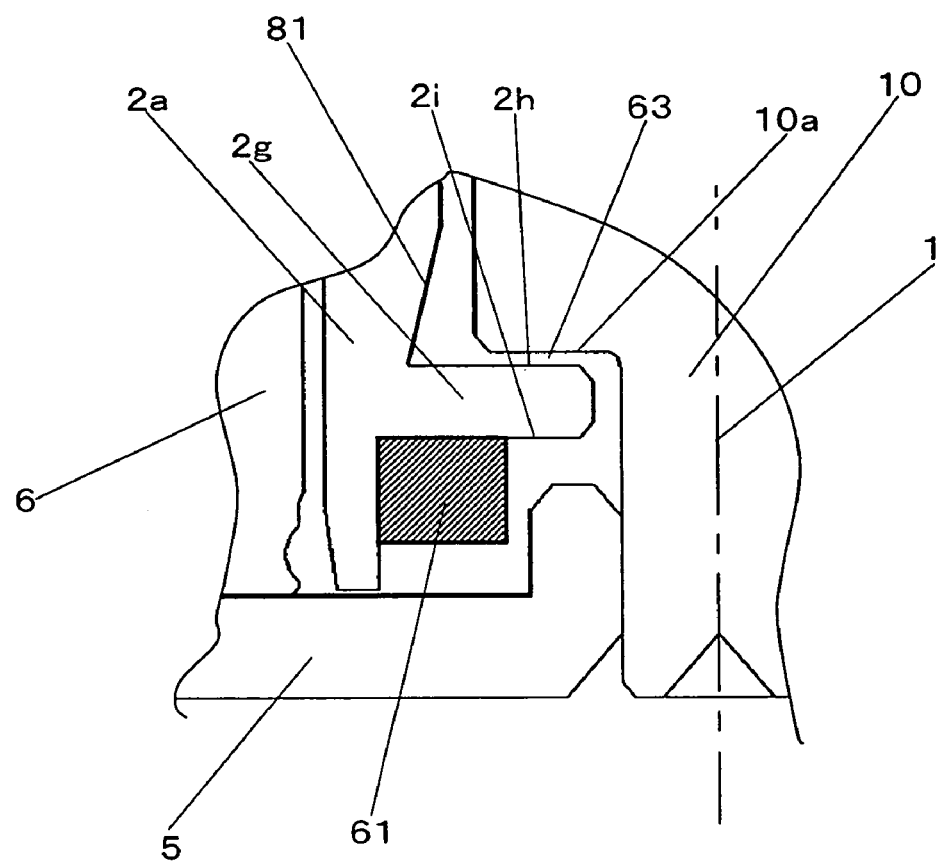
FIG. 8 is a partly enlarged sectional view showing the configuration of another fluid bearing motor of a disk drive in the preferred embodiment 2 of the present invention.

Also, another preferred embodiment is shown in FIG. 8. In FIG. 8, at the inner periphery of hollow cylinder 2a is provided taper shape 81 near the projection 2g at the flange 2b. The taper shape 81 is largest in diameter at the upper stepped surface 2h of the projection 2g. Since the inner periphery of the hollow cylinder 2a is thus configured, even in case the magnetic fluid filled in clearance 63 drains to the top inner periphery from the projection 2g for some reasons, the magnetic fluid will move toward the projection 2g along the tapered surface due to rotationally centrifugal forces. That is, the drained magnetic fluid gathers near the top of the projection 2g. Accordingly, the magnetic fluid will not run out to the top along the inner periphery of the hollow cylinder 2a, and naturally, the surface of disk 14 is not damaged.

Also in the case of a fluid bearing motor in the preferred embodiment 2 of the present invention, as to the predetermined size of clearance between the first stepped surface 2h of projection 2g and the second stepped surface 10a of the fixed shaft, it is necessary to make the size larger than the surface roughness based on the machining accuracy of the upper stepped surface 2h and the second stepped surface 10a of the fixed shaft, and it is limited depending upon the property of the fluid filled therein. In the bearing of the fluid bearing motor in the preferred embodiment 2 of the present invention, it is desirable to set the clearance to a size ranging from 5 µm to 100 µm.

Further, the configuration of the disk drive comprising fluid bearing motor 62 thus configured, disk 14, the signal conversion element, the oscillating means and cover 17 is identical with that of the preferred embodiment 1 described earlier. And, the configuration including fixed shaft 10 and cover 17 is also same as in the preferred embodiment 1.

Also, the configuration of a spindle motor in the preferred embodiment 2 of the present invention is not limited to a so-called radial gap inner rotor motor. It can be applied to the configuration of a so-called radial gap outer rotor motor as well the same as in the preferred embodiment 1, and the description is omitted here.

As described above, according to the present preferred embodiment, same effects as in the preferred embodiment 1 can be obtained. Further, even when the rotor section is moved due to shocks or the like, causing the first stepped surface of the projection to come in slide contact with the second stepped surface of the fixed shaft, the sliding friction is very slight because of the magnetic material existing therebetween. Accordingly, the fluid bearing motor is free from generation of rotational variation and able to maintain smooth rotation. Thus, it is possible to realize a fluid bearing motor reduced in thickness which may assure high shock resistance and excellent reliability Also, using a fluid bearing motor having such a configuration in a disk drive, it is possible to realize an excellent disk drive the same as in the preferred embodiment 1.

(Preferred Embodiment 3)

Figure 9:
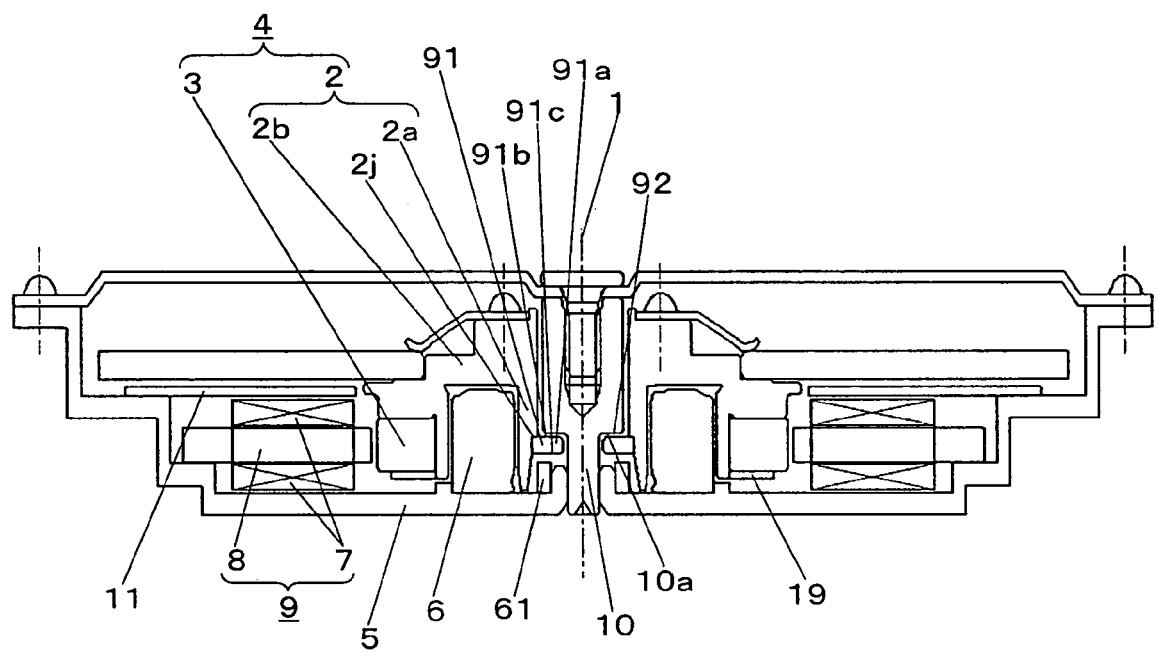
FIG. 9 is a side sectional view showing the configuration of main section of a fluid bearing motor of a disk drive in the preferred embodiment 3 of the present invention.

FIG. 9 shows the configuration of main section of a fluid bearing motor of a disk drive in the preferred embodiment 3 of the present invention. The cross-section of the fluid bearing motor cut at a plane including the rotational center axis is shown in the figure. In FIG. 9, the same elements and names as in FIG. 1 and FIG. 6 are given same reference numerals.

In the present preferred embodiment, in place of projection 2g in the preferred embodiment 2, ring-form stop-ring 91 as a separate member is provided at the inner periphery of hollow cylinder 2a of rotor section 2, and projection 91b is formed.

Different points are mainly described in the following.

In FIG. 9, the inner periphery of hollow cylinder 2a of rotor section 2 configuring rotary body 4 is small in bore diameter at the flange 2b side, and large in bore diameter at the chassis 5 side. The third stepped surface 2j at the boundary between the small bore and the large bore is nearly vertical to the axial direction of the rotational center 1.

The stop ring 91 formed of a ring-like magnetic material having top and bottom surfaces nearly vertical to the axial direction of the rotational center 1 is fastened to the third stepped surface 2j by means of bonding, screwing or other well-known method in such manner that it is abutted on the third stepped surface 2j. More specifically, projection 91a is formed by the stop ring 91 projected from the inner periphery of the hollow cylinder 2a so that it is shaped same as the projection 2g (see FIG. 6) in the preferred embodiment 2.

The bore diameter of stop ring 91 is smaller than the bore diameter of hollow cylinder 2a, and smaller than the large diameter of fixed shaft 10 fixed on the chassis 5 and larger than the small diameter thereof.

In this case, the upper surface of the projection 91a is the first stepped surface 91b. The first stepped surface and the second stepped surface 10a of fixed shaft 10 are configured so as to be opposed to each other with very small predetermined clearance 92 provided therebetween. The clearance 92 is filled with magnetic fluid containing, for example, synthetic oil of hydrocarbon or ester type, the same as in the preferred embodiment 2. Also, permanent magnet 61 is fixed on the chassis 5 so as to be opposed to the lower stepped surface 91c of projection 91a, the same as in the preferred embodiment 2. Since a magnetic material is used as the fixed shaft 10, a closed magnetic circuit is formed where the magnetic flux flows in the order of (a) permanent magnet 61, (b) stop ring 91 formed of a magnetic material, (c) fixed shaft 10, (a) permanent magnet 61. Since a closed magnetic circuit is formed in this way, the magnetic fluid is free from leaking, scattering or running.

Figure 10:
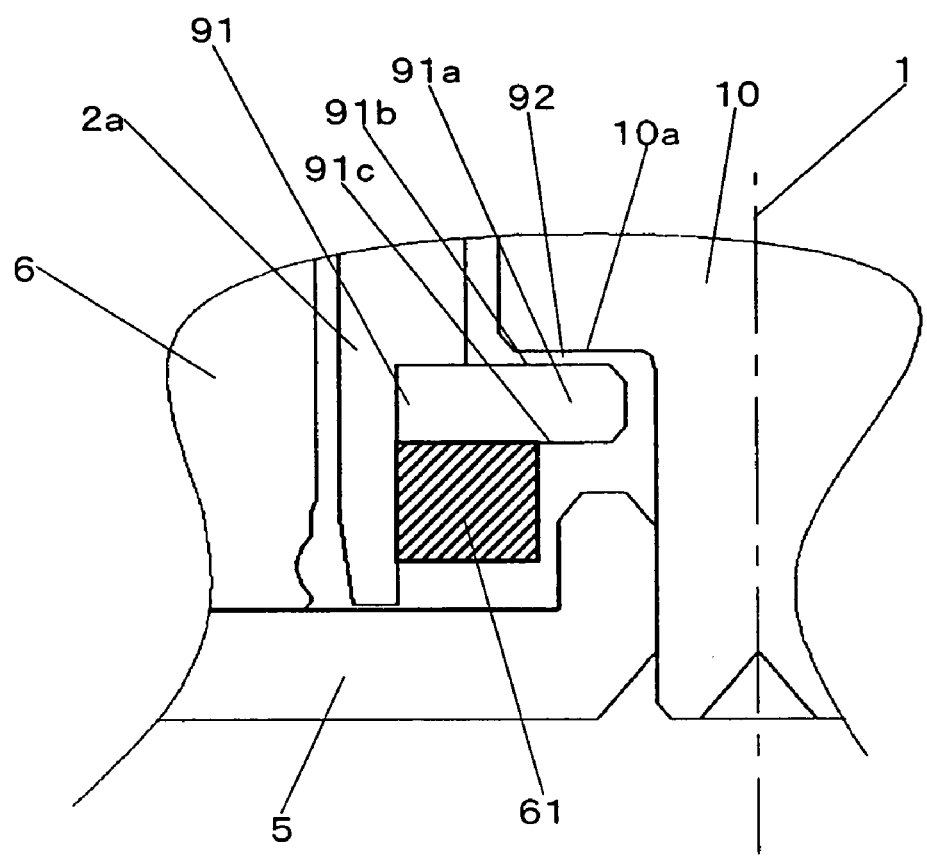
FIG. 10 is a partly enlarged sectional view showing the configuration of an another fluid bearing motor of a disk drive in the preferred embodiment 3 of the present invention.

The same as in the preferred embodiment 2, the permanent magnet 61 is not fixed on the chassis 5, but as shown in the partly enlarged sectional view of FIG. 10, it is preferable to fasten the magnet to the lower stepped surface 91c at the lower part of the stop ring 91.

Also, since a magnetic material is used as the chassis 5, a closed magnetic circuit can be efficiently formed, the same as in the preferred embodiment 2.

Also, the clearance 92 between the first stepped surface 91b and the second stepped surface 10a is very slight, and making the clearance between the inner periphery of the projection 91a and the outer periphery of the fixed shaft 10 opposing thereto larger than the clearance 92, the stop ring 91 is not always necessary to be a magnetic material Further, it is of course preferable to integrate the stop ring 91 and the permanent magnet 61, forming a permanent magnet to be used as a stop ring.

Figure 11:
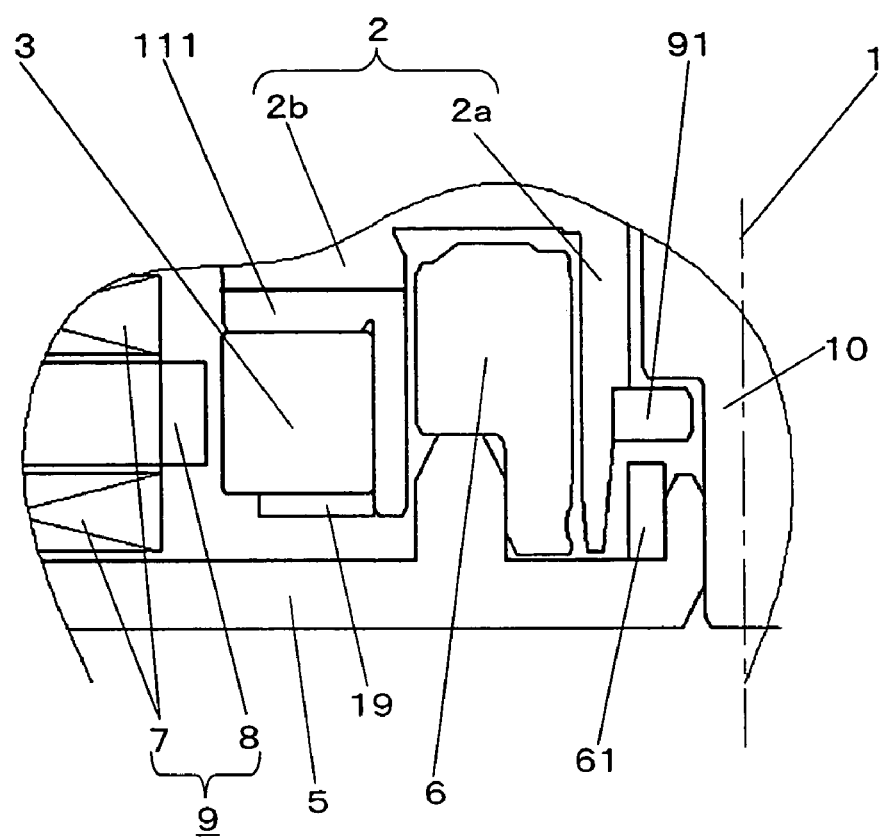
FIG. 11 is a partly enlarged sectional view showing the configuration near the rotary magnet of another fluid bearing motor of a disk drive in the preferred embodiment 2 of the present invention.

Also, FIG. 11 shows a partly enlarged sectional view in the vicinity of rotary magnet 3. The rotary magnet 3 is fixed on back yoke 111 made from a magnetic material by means of bonding or the like, which is then fastened to the underside of flange 2b of rotor section 2. In this configuration, a non-magnetic material of small specific gravity such as aluminum or resin can be used for the manufacture of the rotor section 2. Since the mass of the rotor section 2 is reduced, it is possible to make the rotor section 2 hard to move against vibrations, shocks or the like. Also, since the stop ring 91 is made from a magnetic material, a closed magnetic circuit is formed where the magnetic flux flows in the order of (a) permanent magnet 61, (b) stop ring 91, (c) fixed shaft 10, (d) chassis 5, and (a) permanent magnet 61. Accordingly, it is possible to prevent scattering or running of the magnetic fluid the same as described above.

The configuration as a fluid bearing motor and the configuration as a disk drive are same as in the preferred embodiment 2, and the description is omitted here.

Also, the configuration of a spindle motor in the preferred embodiment 3 of the present invent ion is not limited to a so-called radial gap inner rotor motor. It can be applied to the configuration of a so-called radial gap outer rotor motor, the same as in the preferred embodiment 1 and the preferred embodiment 2, and the description is omitted here.

As described above, according to the present preferred embodiment, same effects as in the preferred embodiment 1 and the preferred embodiment 2 can be obtained. That is, even in case of excessive vibration, dropping or other shocks, the first stepped surface 91*b* comes in slide contact with the second stepped surface 10*a*, and the rotor section will not slip off from the fixed side bearing. Also, due to the magnetic fluid filled between the first stepped surface 91*b* and the second stepped surface 10*a*, the rotational variation of the fluid bearing motor can be suppressed when the first stepped surface 91*b* comes in slide contact with the second stepped surface 10*a*. Further, the assembling procedure is very simple, and it is possible to realize a fluid bearing motor reduced in thickness and most suited for a disk drive, which may assure high shock resistance and excellent reliability.

As for the fluid bearing motor in the preferred embodiment 3 of the present invention, the predetermined size of clearance between the first stepped surface 91*b* and the second stepped surface 10*a* is necessary to be greater than the surface roughness based on the machining accuracy of the first and second stepped surfaces or the magnetic fine particles of magnetic fluid, and also, it is limited depending upon the property of the fluid filled therein. At the bearing of the fluid bearing motor in the preferred embodiment 3 of the present invention, it is desirable to set the clearance to a size ranging from 5 µm to 100 µm.

Also, using a fluid bearing motor having such a configuration in a disk drive, the disk and the signal conversion element can be prevented from excessively bumping against each other. Accordingly, the recording medium formed on the disk surface, the signal conversion element, or the oscillating means for positioning the signal conversion element will not be seriously damaged. Also, the fluid bearing motor is free from rotational vibration due to shocks or other causes that may result in serious damage to the information recording/reproducing operation, and it is possible to realize a thin disk drive which may assure high shock resistance.

(Preferred Embodiment 4)

Figure 12:
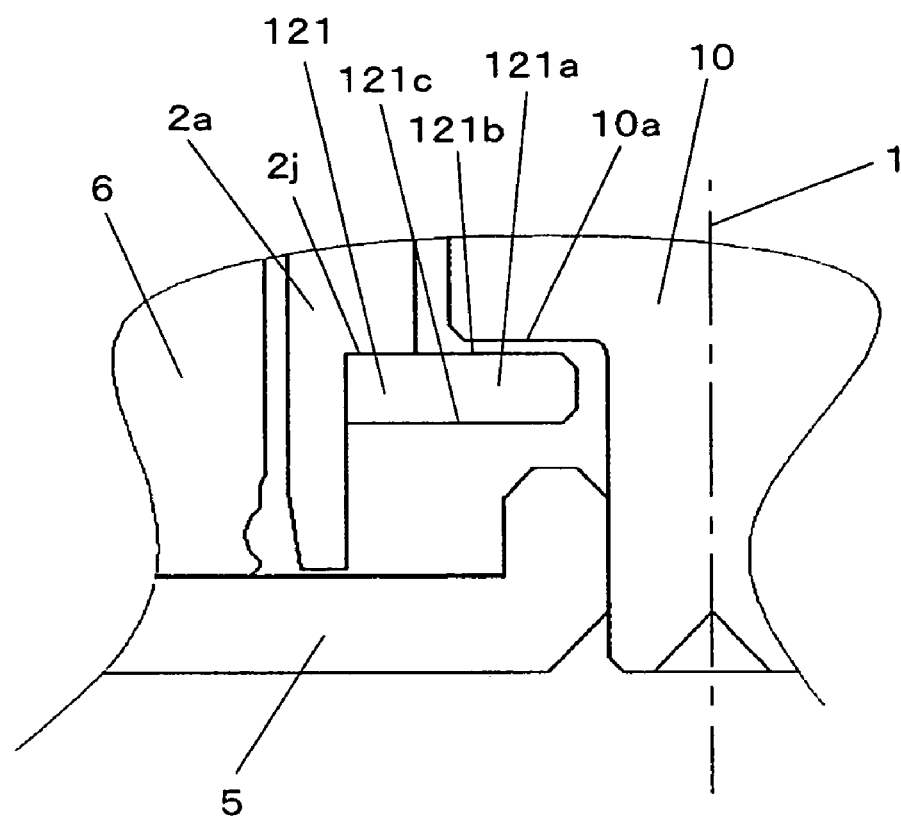
FIG. 12 is a partly enlarged sectional view showing the configuration near the stop ring of a fluid bearing motor of a disk drive in the preferred embodiment 4 of the present invention.
Figure 13:
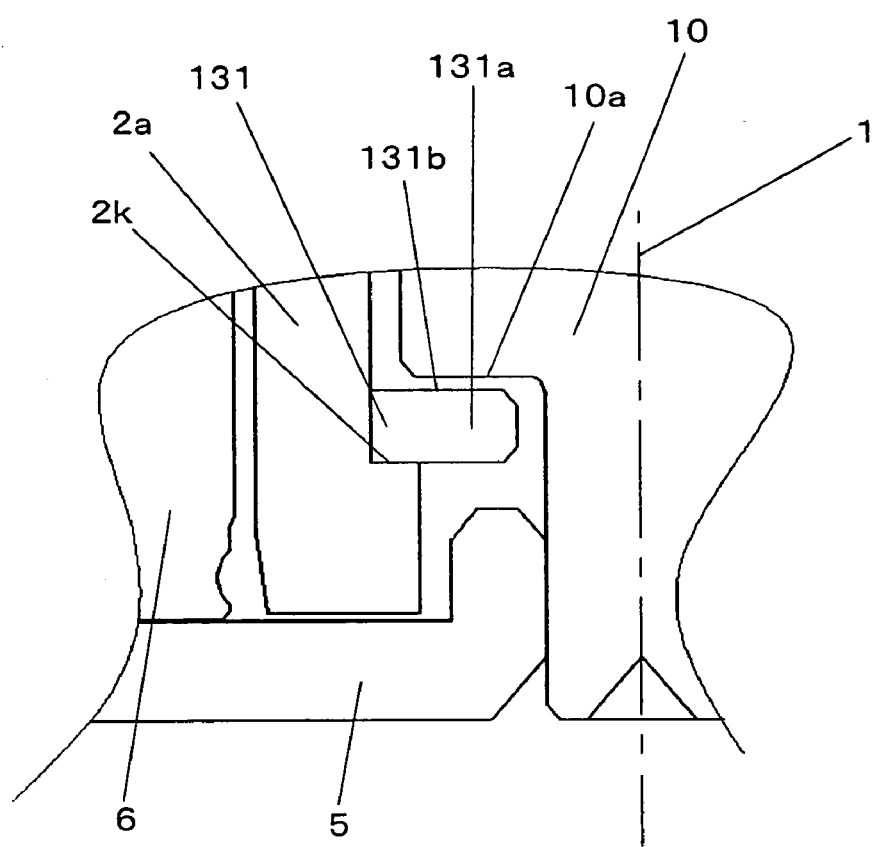
FIG. 13 is a partly enlarged sectional view showing the configuration near the stop ring of another fluid bearing motor of a disk drive in the preferred embodiment 4 of the present invention.

FIG. 12 is a partly enlarged sectional view showing the configuration near the stop ring of a fluid bearing motor of a disk drive in the preferred embodiment 4 of the present invention. FIG. 13 is a partly enlarged sectional view showing the configuration near the stop ring of a fluid bearing motor of another disk drive in the preferred embodiment 4 of the present invention. In FIG. 12 and FIG. 13, the same elements as in FIG. 1 and FIG. 9 described above are given same reference numerals.

In FIG. 12, (i) the third stepped surface 2*j* of hollow cylinder 2*a* is shaped nearly vertical to the axial direction of rotational center 1, (ii) to form projection 121*a*, ring-form stop ring 121 is abutted on the third stepped surface 2*j* so as to be nearly vertical to the axial direction of the rotational center 1, (iii) the first stepped surface 121*b* at the upper part of the projection 121*a* of the stop ring 121 is opposed to the second stepped surface 10*a* of the fixed shaft 10 with very slight predetermined clearance provided therebetween, the same as in the preferred embodiment 3 described above.

The differences from the preferred embodiment 3 are such that (i) the material for stop ring 121 is a resin material having low friction characteristics such as polyacetal resin, (ii) no magnetic fluid is filled between the first stepped surface 121*b* and the second stepped surface 10*a*, and (iii) there is provided no permanent magnet opposing to the lower stepped surface 121*c* at the lower part of the stop ring 121. The other configurations are identical with those in the preferred embodiment 3, and the description is omitted here.

In the above configuration, even when subjected to excessive vibrations, dropping or other shocks, the first stepped surface 121*b* comes in slide contact with the second stepped surface 10*a*, and therefore, the rotor section 2 will not slip off from the fixed side bearing 6. Also, using a resin material having low friction characteristics as the material for stop ring 121, the sliding friction is very much decreased as against the slide contact between the first stepped surface 121*b* and the second stepped surface 10*a*, and it is possible to prevent the fluid bearing motor from rotational variation caused by slide contact.

Also, in the configuration of FIG. 13, the stepped surface of stepped portion 2K is nearly vertical to the axial direction of rotational center 1. In order to form projection 131*a* so as to abut the stepped portion 2K by using a resin material having low friction characteristics such as polyacetal resin and in same dimensional relations as in the preferred embodiment 3, stop ring 131 is secured by a well-know method such as press-fitting, bonding or screwing. In this case, the first stepped surface 131*b*, top surface of the stop ring 131, becomes nearly vertical to the axial direction of the rotational center 1. And, the first stepped surface 131*b* is opposed to the second stepped surface 10*a* of fixed shaft 10 with very slight predetermined clearance provided therebetween. The other configurations are same as in the preferred embodiment 1, and the description is omitted here.

Same as in the configuration shown in FIG. 12, even when subjected to excessive vibrations, dropping or other shocks, the rotor section 2 will not slip off from the fixed side bearing 6. Also, the sliding friction is very low as against the slide contact between the first stepped surface 131*b* and the second stepped surface 10*a*, and it is possible to prevent the fluid bearing motor from rotational variation caused by slide contact.

In the fluid bearing motor in the present preferred embodiment 4 of the present invention, as for the predetermined size of clearance between the first stepped surface 121*b* (131*b*) and the second stepped surface 10*a*, it is necessary to make the clearance greater than the surface roughness based on the machining accuracy of the stepped portion 2K, the first stepped surface 121*b* (131*b*) and second stepped surface 10*a*, and also, it is limited depending upon the property of the fluid filled therein. At the bearing of the fluid bearing motor in the preferred embodiment 4 of the present invention, it is desirable to set the clearance to a size ranging from 5 µm to 100 µm.

Also, the configuration of the disk drive provided with a fluid bearing motor thus configured, disk, signal conversion element, oscillating means and cover is same as in the preferred embodiment 1, the preferred embodiment 2, and the preferred embodiment 3. Also, the configuration of the fixed shaft and cover is also same as in the preferred embodiment 1, the preferred embodiment 2, and the preferred embodiment 3.

Also, the configuration of the spindle motor in the preferred embodiment 4 of the present invention is not limited to a so-called radial gap inner rotor motor. It can be applied to the configuration of a so-called radial gap outer rotor motor as well the same as in the preferred embodiment 1, the preferred embodiment 2, and the preferred embodiment 3, and the description is omitted here.

As described above, according to the present preferred embodiment, same effects as in the preferred embodiment 1, the preferred embodiment 2, and the preferred embodiment 3 can be obtained.

In the preferred embodiment 1 through the preferred embodiment 4, the configuration of a peripheral-opposed core attached motor is described, but the present invention is not limited to such configuration, and it is preferable to be the configuration of a plane-opposed core attached motor, and of course, the configuration of a coreless motor.

(Preferred Embodiment 5)

Figure 14:
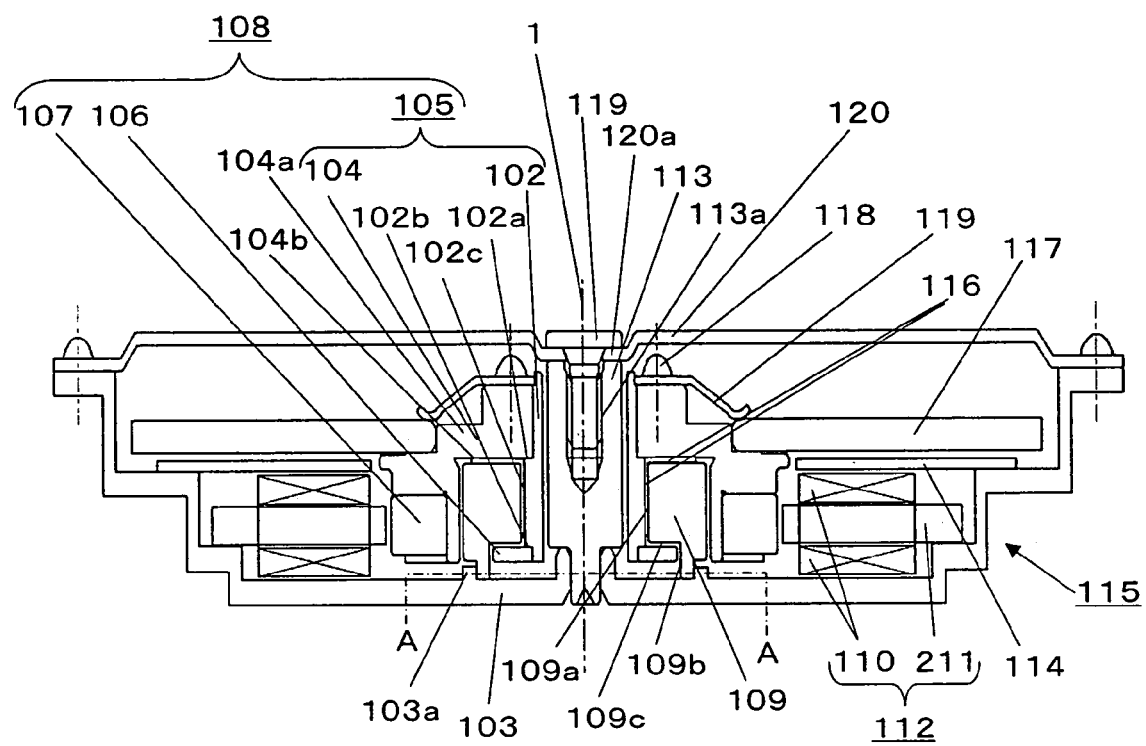
FIG. 14 is a side sectional view describing the configuration of main section of a disk drive with a fluid bearing motor in the preferred embodiment 5 of the present invention.

FIG. 14 is a side sectional view showing the configuration of main section of a disk drive of a fluid bearing motor in the preferred embodiment 5 of the present invention.

In FIG. 14, the rotary shaft 102, a hollow cylinder rotating around the rotational center 101, is a hollow cylindrical shape having a stepped portion at its outer periphery. The stepped surface 102a formed at the upper side (opposite to the chassis 103 side) of the rotary shaft 102 and the outer periphery 102c of the stepped surface 102b formed at the lower side (the chassis 103 side) are formed with radial dynamic pressure generating grooves. The rotor unit 104 is secured so as to be abutted on the stepped surface 102a and fitted on the outer periphery of rotary shaft 102 above the stepped surface 102a by a well-known method such as press-fitting, bonding or the like. Rotor 105 comprises the rotary shaft 102a and the rotor unit 104. The rotor 105 is not necessary to be formed of individual members such as rotary shaft 102 and rotor unit 104, but it is also preferable to be integrally formed. The ring-form stop ring 106 is secured so as to be abutted on the stepped surface 102b and fitted on the outer periphery of the rotary shaft 102 below the stepped surface 102b by a well-known method such as press-fitting, screwing or caulking. The stop ring 106 is preferable to be formed of a metallic material or a resin material having low friction characteristics. The rotor unit 104 has flange 104a, and the underside 104b of the flange 104a is formed with a thrust dynamic pressure generating groove. Also, the rotary magnet 107 magnetized by a plurality of magnetic poles is fixed on the underside (chassis 103 side) at the outer periphery of the flange 104a by press-fitting, bonding or other method. Rotary body 108 comprises the rotary shaft 102, rotor unit 104, stop ring 106 and rotary magnet 107.

The fixed side bearing 109 opposed to each of the outer periphery 102c and the flange 104a via a small clearance is secured on the chassis 103 by bonding, screwing or other well-known method.

The fixed side bearing 109 has two inner peripheries different in bore diameter. And, the first inner periphery 109a smaller in bore diameter of the fixed side bearing 109 is opposed to the second outer periphery 102c of the rotary shaft 102 via a small clearance. Also, the stepped surface 109c that is the boundary between the first inner periphery 109a of the fixed side bearing 109 and the second inner periphery 109b larger in bore diameter is opposed to the top surface of the stop ring 106 via a small clearance. The stepped surface 109c is nearly right-angled to the center axis of the fixed side bearing. And, the second inner periphery 109b is opposed to the outer periphery of the stop ring 106.

The chassis 103 has positioning projection 103a for positioning the fixed side bearing 109. At the inner periphery of the positioning projection 103a, the outer periphery of the chassis 103 of the fixed side bearing 109 is fitted on the inner periphery of the positioning projection 103a. The positioning projection is preferable to be ring-form or at least three cylinders configured on the same circumference.

Figure 15:
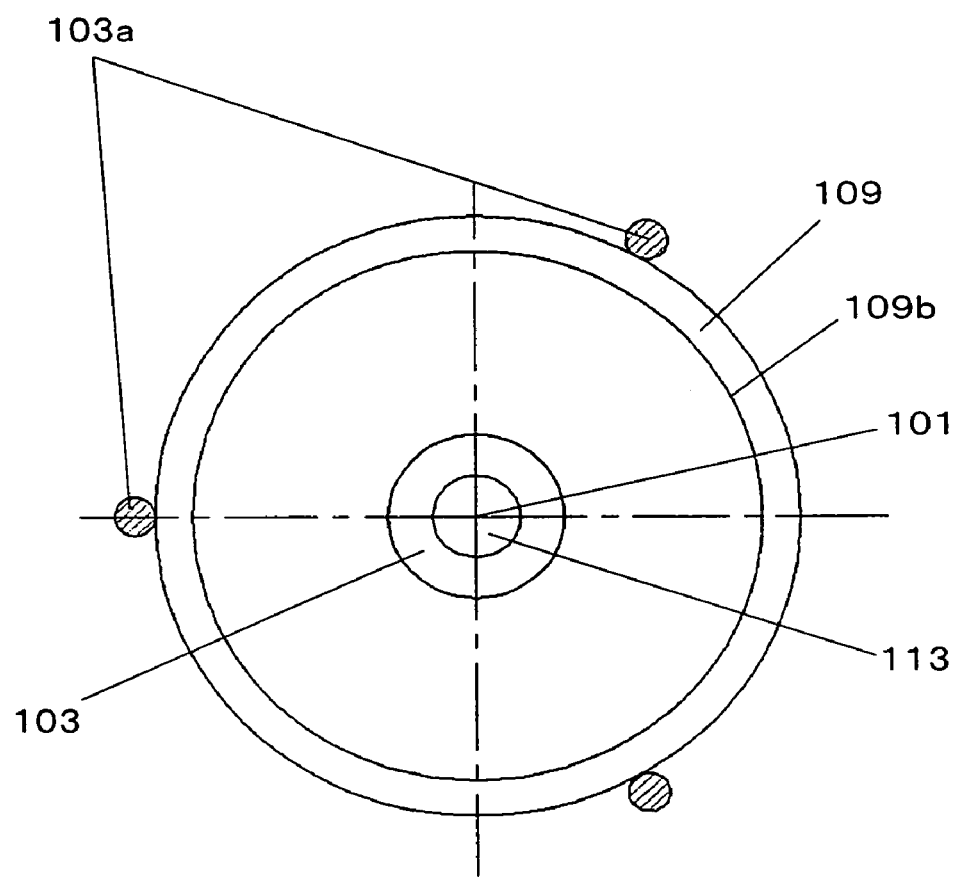
FIG. 15 is a partly sectional view showing the vicinity of the bearing portion of a fluid bearing motor of a disk drive in the preferred embodiment 5 of the present invention.

FIG. 15 corresponds to the cross-section along the A—A line shown in FIG. 14. As shown in FIG. 15, in the present embodiment, there are provided at least three cylindrical positioning projections 103a. Also, the shape of each positioning projection 103a is not limited to a cylindrical shape at all. It is preferable provided that a part of the outer periphery of the positioning projection 103a is in external contact with the outer periphery near the chassis 103 of the fixed side bearing 109. Using the positioning projection 103a thus formed as a positioning guide, the fixed side bearing 109 is secured on the chassis 103.

The stator 112 is formed of coil 110 and stator core 211, and is fixed on the chassis 103. The coil 110 is wound on a plurality of magnetic pole-tips of the stator 112. The inner periphery at the end of the plurality of magnetic pole-tips of the stator 112 is opposed to the outer periphery of the rotary magnet 107 fixed on the rotor unit 104. The fixed shaft 113 is nearly axially aligned to the rotational center 1, and inserted into the hollow of the rotary shaft 102 with clearance provided therebetween, and is fixed on the chassis 103 by a well-known method such as press-fitting or bonding. Also, the fixed shaft 113 is formed with a female thread at the center of the end portion opposite to the chassis side. Shield plate 114 for shielding the magnetic flux leaking from the stator 112 is secured on the chassis 103. Fluid bearing motor 15 is configured in this way.

Between the outer periphery 102c of rotary shaft 102 and the first inner periphery 109a of fixed side bearing 109, and between the underside 104b of flange 104a and the top end of fixed side bearing 109 opposed thereto is filled, for example, hydrodynamic lubricant 116 such as ester type synthetic oil. A radial fluid bearing is formed by the outer periphery 102c and the first inner periphery 109a opposing to the surface thereof A thrust fluid bearing is formed by the underside 104b of flange 104a and the upper end surface of fixed side bearing 109 opposing thereto. The dynamic pressure generating groove of the radial fluid bearing is a herringbone groove formed by well-known technology. The dynamic pressure generating groove of the thrust fluid bearing is, for example, spirally shaped such that the hydrodynamic lubricant 116 is pumped up in the direction toward the rotational center 1. In use of such spiral shape, the hydrodynamic lubricant 116 will not run outside.

The outer periphery 102c of rotary shaft 102 is formed with a radial dynamic pressure generating groove, and the underside 104b of flange 104a is formed with a thrust dynamic pressure generating groove in the above description, but the present invention is not limited to the configuration. It is preferable to form a radial dynamic pressure generating groove at either the outer periphery 102c of rotary shaft 102 or the first inner periphery 109a opposing thereto. And, it is preferable to form a thrust dynamic pressure generating groove at either the underside 104b of flange 104a or the top end surface of fixed side bearing 109 opposing thereto.

The first inner periphery 109a is vertically held with the underside 104b of flange 104a and the top surface of stop ring 106. Accordingly, the rotor 105 rotationally floats due to the thrust fluid bearing. It is necessary to set the clearance between the stepped surface 109c and the top surface of stop ring 106 to a size more than the amount of floating.

Figure 16:
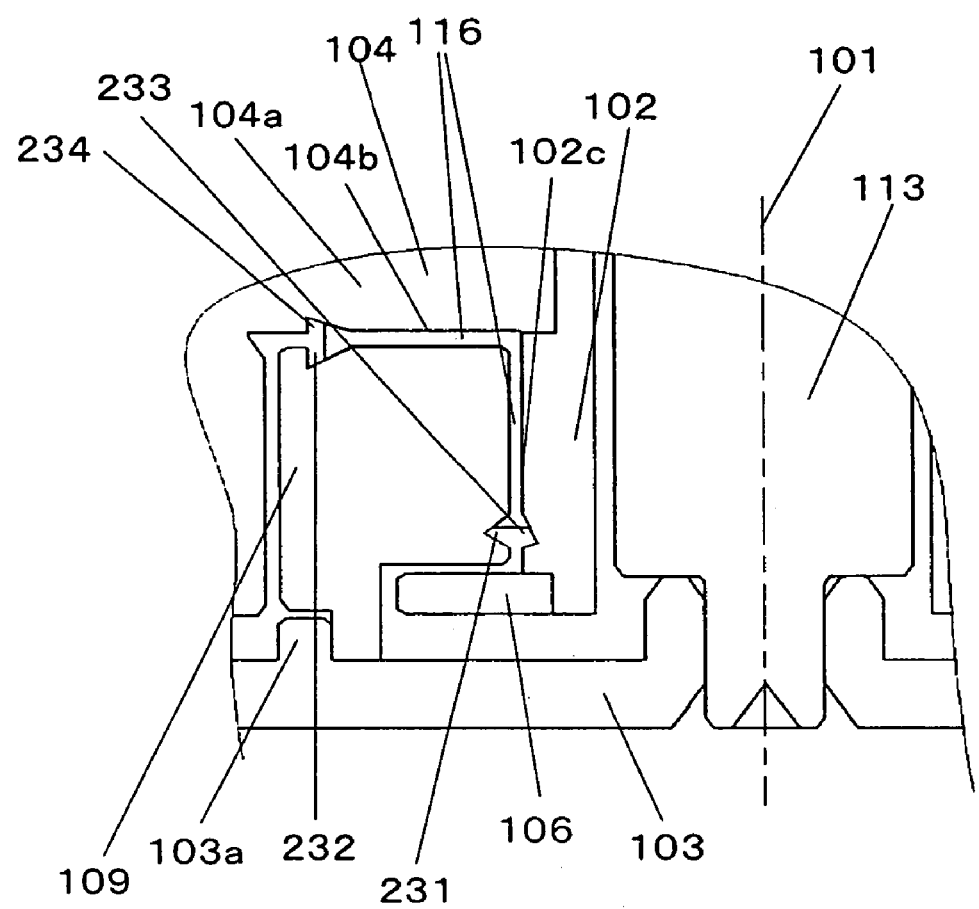
FIG. 16 is a partly sectional view for describing the hydrodynamic lubricant reservoir in the preferred embodiment 5 of the present invention.

FIG. 16 is a partly sectional view showing a hydrodynamic lubricant reservoir in the present preferred embodiment.

As shown in FIG. 16, (i) hydrodynamic lubricant reservoir 231 is formed at the lower side (chassis 103 side) of the first inner periphery 109a of fixed side bearing 109, (ii) hydrodynamic lubricant reservoir 232 is formed at the outer periphery of the upper end surface of fixed side bearing 109, (iii) hydrodynamic lubricant reservoir 233 is formed at a position at the lower part of the outer periphery 102c of rotary shaft 102, nearly opposing to the hydrodynamic lubricant reservoir 231, and (iv) the fourth hydrodynamic lubricant reservoir 234 is formed at the outer periphery of the underside 104b of flange 104a, nearly opposing to the hydrodynamic lubricant reservoir 232. The hydrodynamic lubricant 116 of the hydrodynamic lubricant reservoir 231 through the hydrodynamic lubricant reservoir 234 will not run outside due to the action of surface tension or the like. The sectional shapes of the hydrodynamic lubricant reservoir 232 through the hydrodynamic lubricant reservoir 234 are generally triangular in the figure, but the present invention is not limited to the shapes at all. The hydrodynamic lubricant reservoir 233 and the hydrodynamic lubricant reservoir 234 can be omitted.

Next, the outline of the assembling procedure of fluid bearing motor 115 having such a configuration will be described in the following.

First, the rotor unit 104 is secured so as to be abutted on the stepped surface 102a at the upper side of rotary shaft 102 and fitted on the outer periphery above the stepped surface 102a of rotary shaft 102 by a well-know method such as press-fitting or bonding. And, the rotary magnet 107 is fixed on the underside at the outer periphery of flange 104a by press-fitting, bonding or other method, thereby forming a rotary body sub-unit. It is preferable to fix the rotor unit 104 on the rotary shaft 102 after fixing the rotary magnet 107 on the rotor unit 104.

Subsequently, each dynamic pressure generating groove of the thrust fluid bearing and the radial fluid bearing is coated (supplied) with the hydrodynamic lubricant 116.

The fixed side shaft 109 is inserted opposite to the second outer periphery 102c of the rotary shaft 102.

Next, the stop ring 106 is abutted on the stepped surface 102b of rotary shaft 102, and is screwed to the stepped surface 102b. Or, the stop ring 106 is fixed on the rotary shaft 102 by fitting it on the outer periphery under the stepped surface 102b. Or, the stop ring 106 is fixed on the rotary shaft 102 by caulking it at the end of the rotary shaft 102.

The rotary body 108 comprising rotor 105, rotary magnet 107 and stop ring 106, and the fixed side bearing 109 form a rotary body bearing unit.

On the other hand, the stator 112 formed of coil 110 and stator core 211 is fixed on the chassis 103 in a predetermined position by bonding or other well-known method. And, the shield plate 114 is fixed on the chassis 103 in such manner as to cover the stator 112. Further, the fixed shaft 113 is secured on the chassis 103 in a predetermined position by a method such as press-fitting or bonding, thereby forming a chassis sub-unit. It is preferable to fix the stator 112 and the shield plate 114 on the chassis 103 after securing the fixed shaft 113.

Next, the fixed shaft 113 secured on the chassis 103 forming the chassis sub-unit is set through the hollow of the rotary shaft 102 forming the rotary body unit, and the fixed side bearing 109 is fixed on the chassis 103 by screwing or bonding, regulating the fitting position by the positioning projection 103a. The fluid bearing motor 115 is manufactured in this way.

Subsequently, the disk 117 with a recording medium layer (also called recording medium film, not shown) formed thereon is placed on the top surface of the flange 104a. The disk 117 is pressed and fixed on the top surface of the flange 104a, securing the elastic disk holding member 119 by means of screw 118.

Although it is not shown in the figure, a signal conversion element (for example, magnetic head or optical head) for recording/reproducing signals on the recording medium layer formed on the disk 117 is disposed opposite to the disk 117 via an oscillating means (for example, suspension or optical pickup carrier) for positioning to the predetermined track position.

Also, the recording medium layer formed on the disk 117 is preferable to be formed on both top and bottom surfaces of the disk 117. In this case, the signal conversion element and the oscillating means are respectively opposed to the recording medium layers formed on the top and bottom surfaces of the disk 117.

Next, the lower end of abutment 120a of the cover 120 is abutted on the upper end of fixed shaft 113. And, the cover 120 is screwed onto the female thread 113a of fixed shaft 113 by means of set-screw 121 via the through-hole formed in the abutment 120a. Further, the peripheral edge of the cover 120 is screwed to the chassis 103 or a casing (not shown) or the like. A disk drive is configured, comprising the disk 117, signal conversion element, oscillating means, fluid bearing motor 115, and cover 120. The cover 120 and the fixed shaft 113 are just enough to be abutted, which are not always required to be screwed.

Even when the cover 120 is compressed by an external force, since the tip end of the fixed shaft 113 is set higher than the position of the uppermost end (the end nearest to the abutment 120a of cover 120) of the rotary portion of the rotor 105 or rotary body 108, and the abutment 120a of cover 120 is abutted on the tip end of the fixed shaft 113, the cover 120 will not come in slide contact with the rotary portion of the fluid bearing motor 115. That is, the fluid bearing motor 115 is free from rotational variation.

The clearance between the uppermost end of the rotary body 108 and the abutment 120a of cover 120 is greater than the clearance between the stepped surface 109c and the top surface of the stop ring 106.

Also, since the cover 120 is secured on the fixed shaft 113 at the upper center of the fluid bearing motor 115, the whole casing including the chassis 103 is enhanced in rigidity, and it is possible to make the resonance point higher. As a result, the level of vibration generated due to the rotation of the fluid bearing motor 115 or the like can be effectively lowered. Also, as the whole casing is increased in rigidity, it is possible to prevent the occurrence of permanent deformation even in case an excessive load such as dropping shock is applied to the casing.

Further, using a magnetic material as chassis 103, an attractive force is created between the rotary magnet 107 and the chassis 103 opposing to the bottom end thereof. Also, since the central height of the stator core 211 is lower than the central height of the rotary magnet 107, the attractive force acts to move the rotor 105 down to the lower (chassis 103) side. In this way, floating of the rotor 105 can be suppressed against normal vibrations or shocks.

Also, even in case of excessive vibration, dropping or other shocks, the top surface of the stop ring 106 comes in slide contact with the stepped surface 109c of the fixed side bearing 109, and the rotor 105 will not slip off from the fixed side bearing 109.

Further, since the clearance between the top surface of the stop ring 106 and the stepped surface 109c is very slight, even when the stepped surface 109c comes in slide contact with the top surface of the stop ring 106, the amount of floating (movement) of the rotor 105 is very slight. Accordingly, the signal conversion element for recording/reproducing signals will not surface of the disk 117, and the recording medium or the signal conversion element will not be seriously damaged. Also, the oscillating means will not be seriously damaged.

Also, as the stop ring 106, a resin material having low friction characteristics such as polyacetal resin for example is used, and even when the stepped surface 109c comes in slide contact with the top surface of the stop ring 106 due to shocks or the like, the sliding friction generated by the stepped surface 109c and the top surface of the stop ring 106 is very slight. Accordingly, it is possible to prevent the fluid bearing motor 115 from rotational variation caused by slide contact.

Further, the fixed shaft 113 is set through the hollow of the rotary shaft 102, and thus, the portion where the underside 104b of flange 104a of the thrust fluid bearing is opposed to the upper end of the fixed side bearing 109 becomes remote from the rotational center 1. Consequently, the thrust fluid bearing is increased in bearing rigidity. Accordingly, the bearing length of the radial fluid bearing can be lessened, and the fluid bearing motor 115 and the disk drive can be reduced in thickness.

Figure 17:
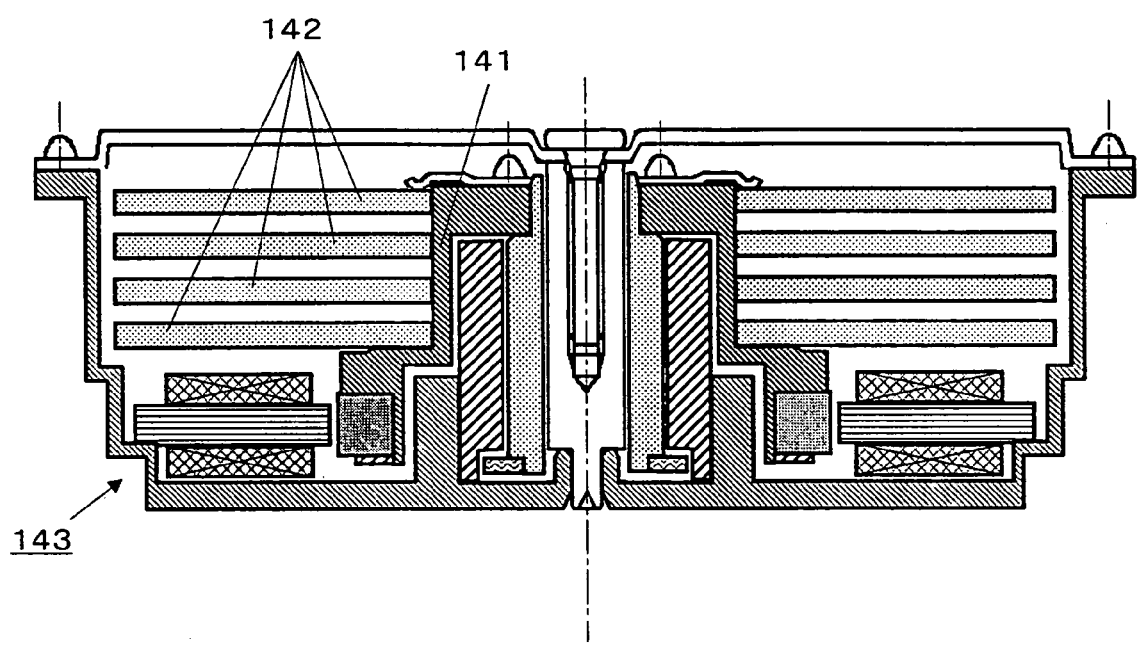
FIG. 17 is a side sectional view showing the configuration of main section of another fluid bearing motor of a disk drive in the preferred embodiment 5 of the present invention.

Also, in the present preferred embodiment 5, the fluid bearing motor 115 and the disk drive loaded with one disk have been described, but as shown in FIG. 17, it is also possible to configure the fluid bearing motor 143 in such manner that a plurality of disks 142 can be placed in the rotor unit 141.

In the preferred embodiment 5, the description refers to a so-called radial gap inner rotor motor, but the present invention is not limited to this. It can be applied to the configuration of a so-called radial gap outer rotor motor as well.

Figure 18:
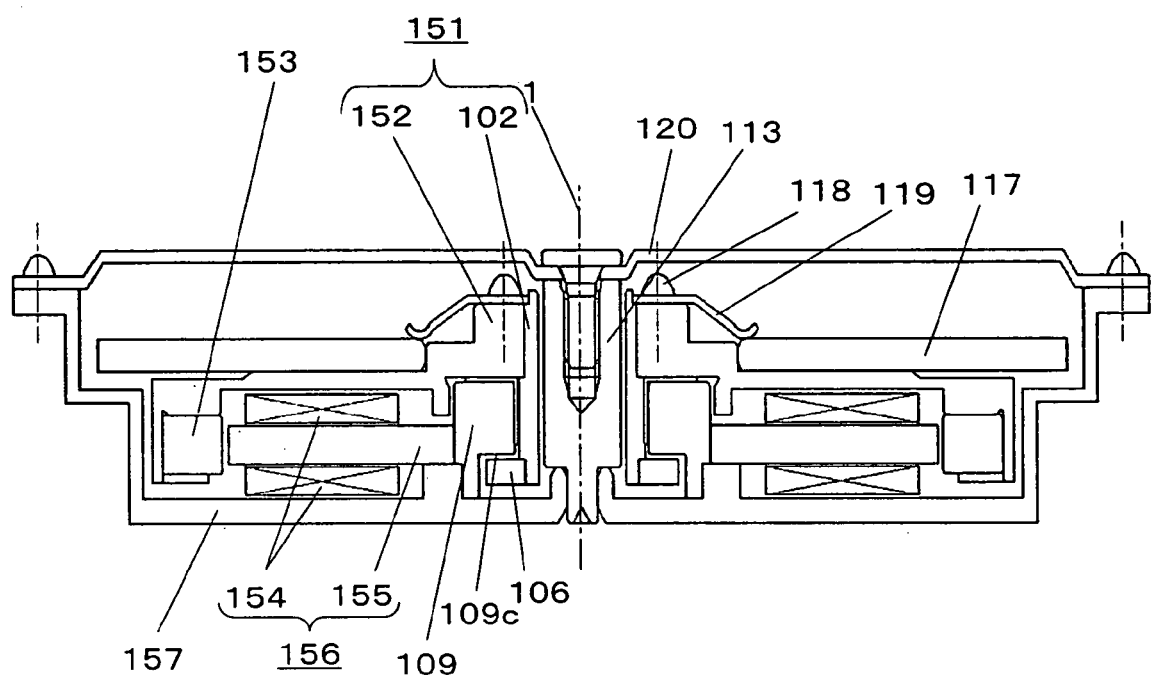
FIG. 18 is a schematic sectional view of main section of a fluid bearing motor and a disk drive showing another example of the preferred embodiment 5 of the present invention.

FIG. 18 shows an example of radial gap outer rotor motor. In FIG. 18, the same elements and names as those in FIG. 14 are given same reference numerals. Stator 156 is fixed on chassis 157 in such manner that the outer periphery of the stator 156 with coil 154 wound on stator core 155 is opposed to the inner periphery of rotary magnet 153 fixed on rotor unit 152 of rotor 151. The configuration in which a predetermined small clearance is provided between the stop ring 106 fixed on the rotary shaft 102 and the stepped surface 109c of fixed side bearing 109 is same as in the preferred embodiment shown in FIG. 14, and the detailed description is omitted here.

As to the predetermined size of clearance between the first stepped surface 109c of fixed side bearing 109 and the top surface of stop ring 106, it is necessary to make the size larger than the surface roughness based on the machining accuracy of the upper stepped portion or the stepped surface, and it is limited depending upon the property of the fluid filled therein. In the bearing of the fluid bearing motor in the present invention, it is desirable to set the clearance to a size ranging from 5 μm to 100 μm.

(Preferred Embodiment 6)

Figure 19:
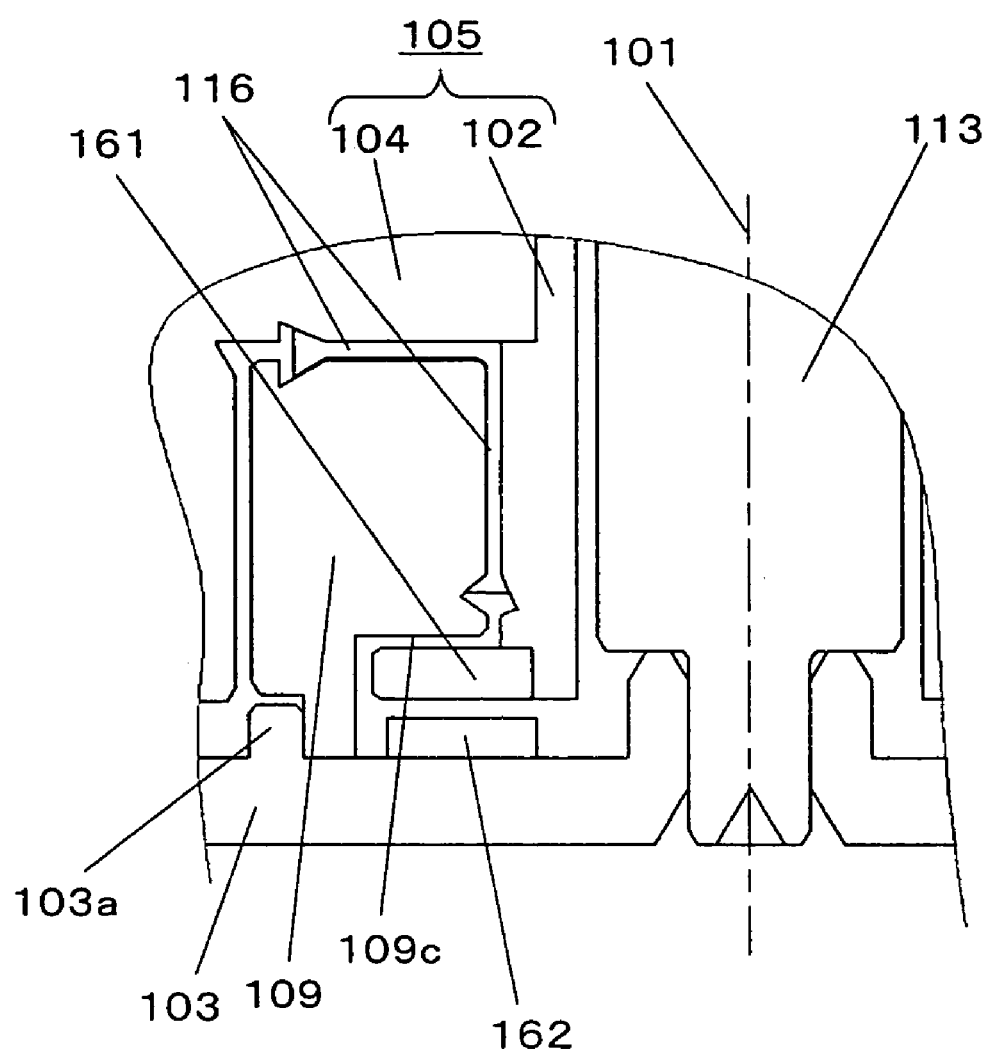
FIG. 19 is a partly enlarged sectional view showing the configuration near the stop ring of a fluid bearing motor of a disk drive in the preferred embodiment 6 of the present invention.

FIG. 19 is a partly enlarged sectional view showing the configuration near the stop ring of a fluid bearing motor of a disk drive in the preferred embodiment 6 of the present invention. The vicinity of the stop ring is enlarged, showing the cross-section at a plane including the rotational center axis of the fluid bearing motor. In FIG. 19, the same elements and names as in FIG. 14 are given same reference numerals, and the description is not repeated here.

In FIG. 19, the shape and the configuration of the rotary shaft 102 and ring-form stop ring 161 are same as in the preferred embodiment shown in FIG. 14. In the present preferred embodiment, the stop ring 161 is made from magnetic material. The configuration in which the top surface of the stop ring 161 is opposed to the stepped surface 109c of fixed side bearing 109 with a slight clearance provided therebetween is same as in the preferred embodiment 5.

Ring-form permanent magnet 162 is secured on chassis 103 so as to be opposed to the underside at chassis 103 side of the stop ring 161.

Except that the stop ring 161 is formed of a magnetic material, and the permanent magnet 162 is secured on the chassis 103 opposing to the stop ring 161, the configuration is same as in the preferred embodiment 5, and the detailed description is omitted here.

In such a configuration, magnetic material is used for the rotary shaft 102, chassis 103, and fixed side bearing 109. Also, as hydrodynamic lubricant 116 used for thrust fluid bearing and radial fluid bearing, magnetic fluid containing synthetic oil for example such as hydrocarbon or ester type is used. In this way, a closed magnetic circuit is formed where the magnetic flux flows in the order of (a) permanent magnet 162, (b) clearance between permanent magnet 162 and stop ring 161, (c) stop ring 161, (d) slight clearance between stop ring 161 and stepped surface 109c, (e) fixed shaft bearing 109, (f) chassis 103, (a) permanent magnet 162. Even in case the hydrodynamic lubricant 116 filled in the radial fluid bearing runs out to the top surface of stop ring 161 for some reasons, the hydrodynamic lubricant 116 then drained will be adsorbed in the small clearance between the stop ring 106 and the stepped surface 109c due to the magnetic attraction of the closed magnetic circuit. Thus, forming a closed magnetic circuit, it is possible to effectively prevent the hydrodynamic lubricant 116 from leaking, scattering or running outside. Even when the rotary shaft 102, chassis 103 and stop ring 161 are not made from magnetic material, the permanent magnet 162 attracts the magnetic fluid, preventing it from running out.

Also, as to the assembling procedure, a rotary body bearing unit is formed, which comprises the rotary body 108 having rotor 105, rotary magnet 107 and stop ring 161 made from magnetic material, and the fixed side bearing 109. And, a chassis sub-unit is formed by securing the stator 112, shield plate 114, fixed shaft 113, and permanent magnet 162 on the chassis 103. Other than these are same as in the preferred embodiment 5, and the description is omitted here.

Also, another example of a fluid bearing motor equipped with a disk drive in the preferred embodiment 6 is described in the following with reference to FIG. 20.

Figure 20:
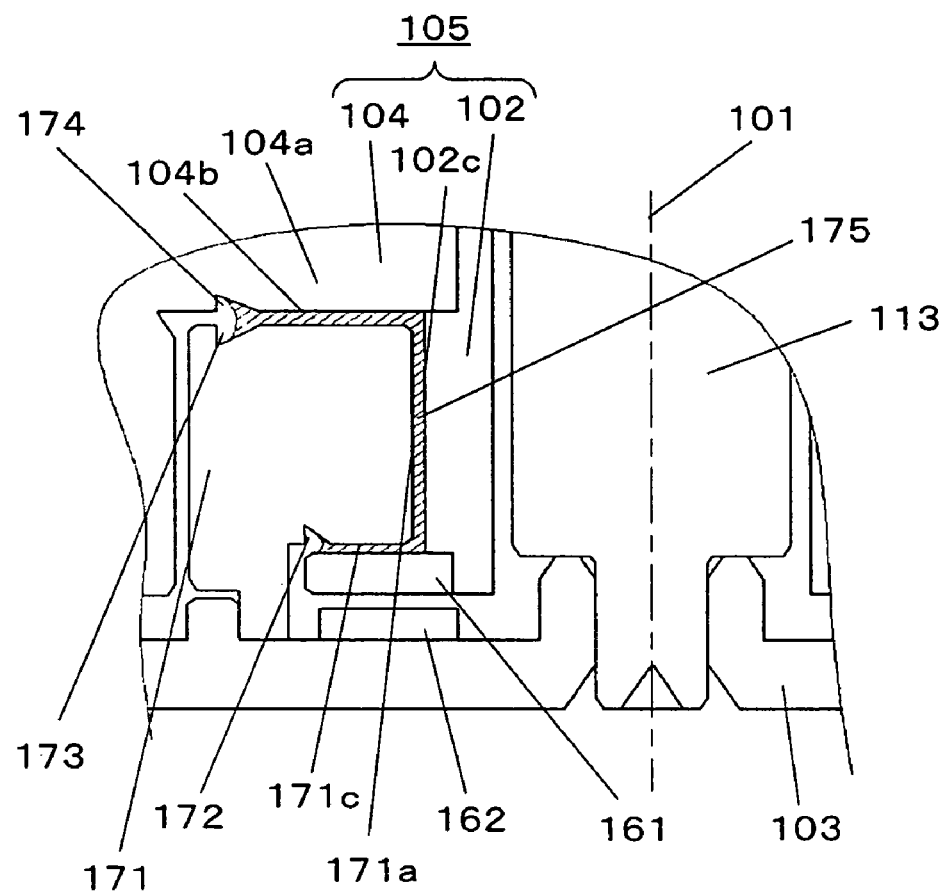
FIG. 20 is a partly enlarged sectional view of a fluid bearing motor showing another example in the preferred embodiment 6 of the present invention.

FIG. 20 is a partly enlarged sectional view showing the configuration near the hydrodynamic lubricant reservoir of another fluid bearing motor equipped with a disk drive in the preferred embodiment 6 of the present invention. The vicinity of the hydrodynamic lubricant reservoir is enlarged in the figure, showing the cross-section at a plane including the rotational center axis of the fluid bearing motor.

In FIG. 20, the same elements and names as in FIG. 14, FIG. 16 and FIG. 19 are given same reference numerals.

In FIG. 20, hydrodynamic lubricant reservoir 172 is formed near the outer periphery of the stepped surface 171c of fixed side bearing 171 opposed to the stop ring 161. Also, same as in FIG. 16, hydrodynamic lubricant reservoir 173 is formed near the outer periphery of the upper end surface of the fixed side bearing 171 opposed to the underside 104b of flange 104a. Further, hydrodynamic lubricant reservoir 174 is formed near the outer periphery of the underside 104b of flange 104a.

In the present preferred embodiment that differs from the preferred embodiment shown in FIG. 16, in place of the hydrodynamic lubricant reservoir 231, hydrodynamic lubricant reservoir 172 is formed at the stepped surface 171*c*, and the hydrodynamic lubricant reservoir 233 is not formed. The stepped surface 171*c* is formed at right angles to the first inner periphery 171*a*.

It is possible to omit the hydrodynamic lubricant reservoir 174 the same as in the preferred embodiment 5.

The hydrodynamic lubricant 175 is filled into slight clearance ranging from the hydrodynamic lubricant reservoir 172 to the hydrodynamic lubricant reservoir 173. A thrust fluid bearing is formed by the underside 104*b* of flange 104*a* and the upper end surface of the fixed side bearing 171. A radial fluid bearing is formed by the outer periphery 102*c* of rotary shaft 102 and the first inner periphery 171*a* of fixed side bearing 171. As hydrodynamic lubricant 175, magnetic fluid including synthetic oil such as hydrocarbon or ester type is used the same as in the preferred embodiment shown in FIG. 19.

As described above, except the position of the hydrodynamic lubricant reservoir 172 and such configuration that the range of hydrodynamic lubricant 175 filled reaches the clearance between the stop ring 161 and the stepped surface 171*c* of fixed side bearing 171, the configuration is same as in the preferred embodiment shown in FIG. 19, and the description is omitted here.

In this configuration, magnetic material is used for the rotary shaft 102, chassis 103 and fixed side bearing 171, and further, magnetic fluid is used as the hydrodynamic lubricant 175. That is, a closed magnetic circuit is formed the same as in the preferred embodiment shown in FIG. 19. Due to the magnetic attraction of the closed magnetic circuit, the hydrodynamic lubricant 175 is adsorbed into the clearance. That is, the hydrodynamic lubricant 175 will not leak, scatter or run out from the clearance between the stop ring 161 and the stepped surface 171*c* of fixed side bearing 171. The same as in the above preferred embodiment, the rotary shaft 102, chassis 103 and stop ring 161 are not always required to be made from magnetic material. Also in this case, the magnetic fluid is adsorbed and maintained by the magnetic flux of the permanent magnet 162.

Also, as to the assembling procedure of the fluid bearing motor having such a configuration, except that the corresponding portion between the hydrodynamic lubricant reservoir 172 and the hydrodynamic lubricant reservoir 173 is coated (supplied) with the hydrodynamic lubricant 175, the configuration is same as in the above preferred embodiment, and the description is omitted here.

In the above preferred embodiment, the permanent magnet 162 is secured on the chassis 103 so as to be opposed to the stop ring 161 in the description, but it is also preferable to secure the permanent magnet 162 on the underside (at chassis 103 side) of the stop ring 161 in such manner as to be opposed to the chassis 103.

As is obvious in the above description, in the present preferred embodiment, same effects as in the preferred embodiment 5 can be obtained, and also, the following effects can be obtained.

Since it is configured in that the stop ring 161 is opposed to the permanent magnet 162 fixed on the chassis 103, magnetic attraction is generated between the stop ring 161 and the permanent magnet 162. That is, the rotor 105 mounted with the disk 117 is attracted toward the chassis 103, resulting in improvement of the vibration resistance. Also, As a closed magnetic circuit is formed, the hydrodynamic lubricant 116, 175 that is magnetic fluid will not leak, scatter or run out. Further, the hydrodynamic lubricant reservoir 172 is disposed at the stepped surface 171*c* of the fixed side bearing 171, and the hydrodynamic lubricant 175 is provided between the stop ring 161 and the stepped surface 171*c* opposing thereto. As a result, even in case of excessive vibration, dropping or other shocks, causing the stop ring 161 to come in slide contact with the stepped surface 171*c*, the sliding friction then caused by slide contact will be very slight. Accordingly, the fluid bearing motor is free from the generation of rotational variation and may assure smooth rotation.

The present preferred embodiment can be applied to the configuration of a so-called radial gap outer rotor motor, the same as in the preferred embodiment 5.

The disk drive comprises a fluid bearing motor having configuration as described above, and a disk, signal conversion element (not shown), oscillating means (not shown), and cover, the same as in the preferred embodiment 5. Also, as to the fixed shaft and cover, the configuration is same as in the preferred embodiment 5.

Also, the same as in the preferred embodiment 5, even when subjected to excessive vibration, dropping or other shocks, the rotary body will not slip off from the fixed side bearing. Further, the force acting to hold the rotor mounted with a disk is great enough to improve the vibration resistance. It is possible to realize a highly reliable fluid bearing motor which is reduced in thickness, most suited for a disk drive, and may assure excellent shock resistance.

Further, a hydrodynamic lubricant reservoir is disposed at the stepped surface of the fixed side bearing, and a hydrodynamic lubricant is provided between the stop ring and the stepped surface of the fixed side bearing opposed thereto. Due to this configuration, even in case of excessive vibration, dropping or other shocks, causing the stop ring to come in slide contact with the stepped surface of the fixed side bearing opposing thereto, the sliding friction then caused by slide contact will be very slight. Accordingly, the fluid bearing motor is free from the generation of rotational variation and may assure smooth rotation.

In the fluid bearing motor in the present preferred embodiment 6, as for the size of clearance between the top surface of stop ring 161 and the stepped surface 109*c*, and between the top surface of stop ring 161 and the stepped surface 171*c*, it is necessary to make the clearance greater than the surface roughness based on the machining accuracy of the stepped portion or the stepped surface or the magnetic fine particle of the magnetic fluid, and it is limited depending upon the property of the fluid filled therein. At the bearing of the fluid bearing motor in the present invention, it is desirable to set the clearance to a size ranging from 5 μm to 100 μm.

Also, the same as in the preferred embodiment 5, even when the cover is compressed by an external force applied to the cover, the cover will not come in slide contact with the rotary portion of the fluid bearing motor. Also, excessive bumping of the disk against the signal conversion element is suppressed, and the recording medium layer formed on the disk surface, the signal conversion element for recording/reproducing signals, or the oscillating means for positioning the signal conversion element will not be seriously damaged.

In the preferred embodiment 5 and the preferred embodiment 6, the configuration of a peripheral-opposed core attached motor is described, but the present invention is not limited to this configuration, and it is of course preferable to be a plane-opposed core attached motor or a coreless motor.

What is claimed is:

1. A fluid bearing motor comprising:
a hollow cylinder passed through via axis of rotational center;
a flange formed at one end of said hollow cylinder;
a rotor section provided with a rotary magnet disposed on outer bottom of said flange;
a rotary bearing member configured with an outer cylinder surface of said hollow cylinder and a bottom end of said flange;
a chassis;
a generally cylindrical fixed bearing member secured to said chassis and configured with an inner cylinder surface supporting said hollow cylinder so as to be rotatable via a small first radial space and a plane supporting an inner side bottom end of the flange so as to rotate in an axial direction at upper surface of said plane;
a hydrodynamic lubricant filled between said fixed bearing member and said rotary bearing member;
a fixed shaft with one end fixed on the chassis, which passes through the hollow cylinder via a second radial space wider than said first radial space; and
a stator provided with a coil which generates a rotational force in cooperation with the rotary magnet.

2. A fluid bearing motor according to claim 1, wherein:
said fixed shaft includes a small diameter portion and a large diameter portion,
the hollow cylinder is formed with a projection at a part of its inner periphery, and
the projection is arranged in such manner that it is positioned within the diameter of the large diameter portion of the fixed shaft and outside the small diameter portion.

3. The fluid bearing motor of claim 2,
wherein the projection is circular, having a small-bore portion formed at the inner periphery of said hollow cylinder.

4. The fluid bearing motor of claim 2,
wherein a first stepped surface formed by the small-bore portion at the inner periphery of said hollow cylinder and a second stepped surface formed by the small-diameter portion at the outer periphery of said fixed shaft are opposed to each other with a predetermined clearance provided therebetween.

5. The fluid bearing motor of claim 2,
wherein the projection is formed of a stop ring, and
one surface of said stop ring abuts a third stepped surface formed at the inner periphery of said hollow cylinder.

6. The fluid bearing motor of claim 5,
wherein said stop ring is made from a resin material having a low friction factor.

7. The fluid bearing motor of claim 5,
wherein said fixed shaft is made from a magnetic material, and
the clearance between the first stepped surface and the second stepped surface is filled with magnetic fluid, and
said stop ring is formed of a permanent magnet.

8. The fluid bearing motor of claim 5 or 6,
wherein in the vicinity of the first stepped surface, the inner periphery of said hollow cylinder is tapered to increase in bore diameter as it approaches the projection.

9. The fluid bearing motor of claim 2, 3, 4 or 5
wherein the predetermined clearance between the first stepped surface and the second stepped surface ranges from 5 μm to 100 μm.

10. The fluid bearing motor of claim 2 or 5,
wherein said fixed shaft is made from a magnetic material,
the clearance between the first stepped surface and the second stepped surface is filled with magnetic fluid, and
a magnet is disposed on said chassis, opposing to the inner periphery of said hollow cylinder at the chassis side rather than the projection.

11. The fluid bearing motor of claim 10,
wherein said stop ring is made from a magnetic material.

12. The fluid bearing motor of claim 2 or 5,
wherein said fixed shaft is made from a magnetic material,
the clearance between the first stepped surface and the second stepped surface is filled with magnetic fluid, and
a magnet is disposed at the inner periphery of said hollow cylinder at the chassis side rather than the projection.

13. The fluid bearing motor of claim 12,
wherein said stop ring is made from a magnetic material.

14. A fluid bearing motor according to claim 1, wherein:
said fixed bearing member comprises a first inner periphery and a second inner periphery,
the first inner periphery is smaller in diameter than the second inner periphery,
the hollow cylinder is formed with a projection at a part of its outer periphery, and
the projection is arranged in such manner that it is positioned within the diameter of the second inner periphery of the fixed bearing member and outside the first inner periphery.

15. The fluid bearing motor of claim 14,
wherein said projection is formed of a circular stop ring.

16. The fluid bearing motor of claim 14,
wherein a dynamic pressure generating groove is formed in at least one of the first inner periphery and the outer periphery of the hollow cylinder;
the upper end of the fixed side bearing and the lower end of the flange are opposed to each other with a predetermined clearance provided therebetween;
a dynamic pressure generating groove is formed in at least one of the upper end surface of the fixed side bearing and the lower end surface of the flange; and
the hydrodynamic lubricant is filled (i) between the first inner periphery and the outer periphery of the hollow cylinder, (ii) between the upper end of the fixed side bearing and the lower end of the flange, and (iii) between the first stepped surface and the second stepped surface.

17. The fluid bearing motor of claim 14,
wherein the hollow cylinder and the flange are integrally formed from same material.

18. The fluid bearing motor of claim 14, 15, or 16,
wherein the stop ring is made from a resin material having low friction characteristics.

19. The fluid bearing motor of claim 14, 15, or 16,
further comprising a permanent magnet fixed on the chassis, opposing to the other surface of the stop ring with a clearance provided therebetween,
wherein the fixed side bearing is formed from a magnetic material.

20. The fluid bearing motor of claim 14, 15, or 16,
further comprising a permanent magnet fixed on the other surface of the stop ring,
wherein the fixed side bearing is formed from a magnetic material.

21. The fluid bearing motor of claim 19,
wherein the stop ring is formed from a magnetic material.

22. The fluid bearing motor of claim 20,
wherein the stop ring is formed from a magnetic material.

23. The fluid bearing motor of claim 14, 15, 16, or 17,
wherein the predetermined clearance between the stepped surface and the other surface of the stop ring ranges from 5 µm to 100 µm.

24. The fluid bearing motor of claim 14, 15, 16, or 17,
wherein the chassis has a positioning projection for positioning the fixed side bearing.

25. The fluid bearing motor of claim 24,
wherein the positioning projection is ring-form, and the outer periphery of the fixed side bearing engages the inner periphery of the positioning projection.

26. The fluid bearing motor of claim 25,
wherein the positioning projections are at least three columnar projections which externally come in contact with the outer periphery of the fixed side bearing.

* * * * *